(12) United States Patent
Nishii et al.

(10) Patent No.: US 7,349,612 B2
(45) Date of Patent: Mar. 25, 2008

(54) OPTICAL ELEMENT, OPTICAL CIRCUIT PROVIDED WITH THE OPTICAL ELEMENT, AND METHOD FOR PRODUCING THE OPTICAL ELEMENT

(75) Inventors: Junji Nishii, Ikeda (JP); Tatsuhiro Nakazawa, Ikeda (JP); Shigeo Kittaka, Osaka (JP); Keiji Tsunetomo, Osaka (JP)

(73) Assignees: Nippon Sheet Glass Company, Limited, Osaka (JP); National Institute of Advanced Industrial Science and Technology, Tokyo (JP)

( * ) Notice: Subject to any disclaimer, the term of this patent is extended or adjusted under 35 U.S.C. 154(b) by 39 days.

(21) Appl. No.: 10/765,309

(22) Filed: Jan. 27, 2004

(65) Prior Publication Data

US 2005/0128592 A1  Jun. 16, 2005

(30) Foreign Application Priority Data

Jan. 28, 2003 (JP) ............................. 2003-018990
Jun. 30, 2003 (JP) ............................. 2003-187105

(51) Int. Cl.
   *G02B 6/10* (2006.01)
(52) U.S. Cl. ....................................... 385/129; 385/14
(58) Field of Classification Search ................ None
   See application file for complete search history.

(56) References Cited

U.S. PATENT DOCUMENTS

| | | | | |
|---|---|---|---|---|
| 4,796,226 A | * | 1/1989 | Valette | 365/122 |
| 5,210,801 A | * | 5/1993 | Fournier et al. | 385/14 |
| 5,419,804 A | * | 5/1995 | Ojha et al. | 438/718 |
| 5,937,113 A | * | 8/1999 | He et al. | 385/11 |
| 6,088,496 A | * | 7/2000 | Asghari | 385/37 |
| 6,188,819 B1 | * | 2/2001 | Kosaka et al. | 385/39 |
| 6,819,853 B2 | * | 11/2004 | Lam et al. | 385/131 |

OTHER PUBLICATIONS

S. Janz, et al., "TuK2(Planar waveguide echelle gratings: an embeddable diffractive element for photonic integrated circuits)", Proceedings of OFC 2002, Mar. 2002, pp. 69-70.

Christopher N. Morgan, et al., "Compact Integrated Silica Wavelength Filters", IEEE Photonics Technology letters, vol. 14, No. 9, Sep. 2002, pp. 1303-1305.

Susumu Noda, et al., "Full Three-Dimensional Photonic Bandgap Crystals at Near-Infrared Wavelengths", SCIENCE, vol. 289, Jul. 2000, pp. 604-606.

J. Koyama, et al. "Optical Wave Electronics", Corona Publishing Co., Ltd., Tokyo, 1978, Chapter 4, pp. 98-101 and 132 (with partial translation).

* cited by examiner

*Primary Examiner*—Rodney Bovernick
*Assistant Examiner*—Mike Stahl
(74) *Attorney, Agent, or Firm*—Hamre, Schumann, Mueller & Larson, P.C.

(57) ABSTRACT

An optical element of the present invention includes a structure having at least one convex portion and at least one concave portion formed so as to be adjacent to either one of the convex portions. At least one surface of the structure is covered, and the optical element has a hollow portion. At least one surface of the structure is covered with a covering layer formed by a deposition process.

17 Claims, 20 Drawing Sheets

Covering layer

Periodic structure

Substrate 111a  112a 111b  112b 113c  111c  112c 113d  111d  112d

OPTICAL ELEMENT, OPTICAL CIRCUIT PROVIDED WITH THE OPTICAL ELEMENT, AND METHOD FOR PRODUCING THE OPTICAL ELEMENT

BACKGROUND OF THE INVENTION

1. Field of the Invention

The present invention relates to an optical element, an optical circuit provided with the optical element, and a method for producing the optical element.

2. Description of the Related Art

Due to the rapid spread of the Internet, there is a strong demand for an increase in the information transmission capacity of an optical fiber communication network. Under such a circumstance, wavelength division multiplexing (WDM) has been developed rapidly. The WDM is a communication technique of multiplexing independent information to transmit it, using light having a plurality of different wavelengths. According to this technique, in order to demultiplex a signal, an optical demultiplexer having a satisfactory wavelength selectivity is required.

In recent years, optical communication by the WDM is applied not only to long distance networks but also to short distance, metropolitan and access networks. In this case, Coarse Wavelength Division Multiplexing (CWDM) using a relatively wide channel width is used mainly, instead of Dense Wavelength Division Multiplexing (DWDM) as in long distance networks.

Unlike the DWDM, an optical demultiplexer in the CWDM is required to have performance such as a small setting space and high resistance to temperature and humidity, and also is required to be mass-produced. More specifically, miniaturization, high stability, low cost, and the like are demanded of the optical demultiplexer.

One way to satisfy the above-mentioned demand is to form an optical demultiplexer of a planar lightwave circuit (PLC) type using an optical waveguide. The optical demultiplexer of a PLC type can be miniaturized, and its substrate can be processed in large quantity on a wafer basis by lithography and dry etching. Furthermore, an optical waveguide using silica glass is matched satisfactorily in refractive index with an optical fiber and has a small connection loss, so that the optical waveguide using silica glass is highly practical.

As the above-mentioned optical demultiplexer, arrayed waveguide gratings (AWG) are known. The AWG allows a plurality of optical waveguides (optical waveguide array) having gradually varying optical path lengths to propagate light containing a plurality of wavelength components, and separates wavelengths using a diffraction phenomenon due to a phase shift thus generated.

However, the AWG originally is an optical demultiplexer developed for the DWDM. Therefore, even if the AWG is designed for the CWDM, the effects of cost reduction and miniaturization are small, and hence, the AWG is not suitable for the CWDM.

On the other hand, an optical demultiplexer that separates wavelengths using a reflection-type or transmission-type grating also is well known. This type of optical demultiplexer is configured by combining optical components. An optical demultiplexer in which an optical system is integrated into a PLC also has been developed. Such an optical demultiplexer is described, for example, in "S. Janz and other 13 people, 'Proceedings of OFC 2002', (U.S.), 2002, TVK2" and "Christopher, N. Morgan and other 4 people, 'IEEE Photonics Technology letters', (U.S.), 2002, vol. 14, no. 9, pp. 1303-1305".

A PLC using a reflection-type blaze diffraction grating can be miniaturized by tens of % or more with respect to the AWG, and an optical demultiplexer in which a diffraction grating is integrated into a PLC has the potential for the CWDM.

Furthermore, recently, a photonic crystal has been actively studied as a PLC. The photonic crystal has a configuration in which materials with a large refractive index difference are arranged regularly at a period of about a light wavelength. Due to such a configuration, characteristics that are not found in a conventional homogeneous material, such as steep bending of light and complete confinement can be exhibited.

In order to form a photonic crystal, for example, in an optical communication field, a fabrication technique for forming a periodic structure at a scale from a micron to a submicron is required. A slab-type two-dimensional photonic crystal, in which submicron holes and columnar members are arranged on a substrate surface generally can be produced using a submicron patterning apparatus such as an electron beam drawing apparatus and a dry etching apparatus. Thus, forming a submicron periodic structure on a substrate surface is becoming relatively easy with the development of a fabrication technique for a semiconductor.

Furthermore, a photonic crystal having a periodic structure in a vertical direction of a substrate also has been proposed. By using a two-dimensional or three-dimensional photonic crystal having a periodicity in a vertical direction, an optical resonator using a complete bandgap and a polarizer can be formed. More specifically, a production method for irradiating photosensitive polymer resin with a laser in three directions and forming a periodic structure using light interference, a production method for filling a substrate with silica fine particles with high density, a production method for forming a multi-layered film while maintaining a regular concave/convex shape on the surface of a substrate, and the like have been proposed. However, according to most of the above-mentioned production methods, a point defect and a line defect are introduced into a particular position. Therefore, the degree of freedom in terms of configuration is poor.

In contrast, a three-dimensional photonic crystal with a high degree of freedom having a periodic structure in a vertical direction of a substrate has been reported in "Susumu Noda, Katsuhiro Tomoda, Noritsugu Yamamoto, Alongkarn Chutian, SCIENCE, vol. 289, pp. 604-606, 2000". According to this three-dimensional photonic crystal, the process of attaching periodic structures of line & space formed on a pair of substrates to each other, and peeling only one of the substrates is repeated, whereby a stacked periodic structure (called woodpile type) is realized. According to this production method, a part of a period is removed on a layer basis, or a structure with a varied period can be formed. For example, a photonic crystal waveguide for bending light at a right angle, and a reflection mirror due to a three-dimensional complete bandgap have been reported.

However, in a reflection-type diffraction grating integrated into a PLC, a diffraction grating surface with a height of about several μm from a substrate needs to be formed. Furthermore, a metal film is required as a reflection surface on a diffraction grating surface. In order to produce such a configuration, a complicated and sophisticated processing technique is required.

It also is well known that a wavelength resolution by a diffraction grating is proportional to a product of the order of diffracted light and the number of gratings. Assuming that the order of diffracted light and the size of a diffraction grating are constant, in order to enhance the resolution, the grating period of a diffraction grating must be reduced. In a blaze diffraction grating, when the grating period is about a wavelength, an efficiency difference due to a polarization direction (TE polarized light and TM polarized light), i.e., polarization dependent loss (PDL) is conspicuous. In contrast, when a grating period is increased so as to alleviate the PDL, the number of gratings must be increased, which enlarges a grating. This results in difficulty in miniaturization of an optical demultiplexer. Furthermore, when the order of diffracted light is increased, it is required to remove unnecessary light of a high order using another apparatus, so that an efficiency is reduced necessarily.

On the other hand, in a PLC using a transmission-type diffraction grating, it is required to form a space for forming a diffraction grating in a slab waveguide. However, in the slab waveguide, a cladding layer is formed in an upper portion. Therefore, even if it is attempted to form a diffraction grating in a slab waveguide, it is difficult to maintain a space for forming the diffraction grating when forming a cladding layer in an upper portion of the slab waveguide. Furthermore, air may be used a cladding instead of forming a cladding layer in an upper portion. However, according to such a slab waveguide, a propagation mode becomes a multi-mode, making the polarization dependency very conspicuous.

As the production method for forming a periodic structure, a procedure for forming structures in which defects and the like are freely formed in respective layers, and stacking the structures, so as to form a periodic structure in a vertical direction of the substrate as described above is desirable because of the high degree of freedom.

On the other hand, according to the method for attaching periodic structures formed on a pair of substrates to each other, and peeling only one of the substrates, patterns of new layers are stacked on an underlying pattern. Therefore, not just any patterns may be stacked, and there is a constraint on the patterns to be used. More specifically, the degree of freedom of a structure is not so high.

Furthermore, in order to attach the periodic structures to each other, for example, assuming that a semiconductor is a substrate material, a high-degree and complicated process is required, in which structures are fused to each other in a furnace of 500° C. with a positional precision at nano-level, and repeating this by the number of layers. Needless to say, a material to be used also is limited to those which can be fused. Furthermore, it is not easy to enlarge an area.

SUMMARY OF THE INVENTION

Therefore, with the foregoing in mind, it is an object of the present invention to provide an optical element with a high degree of freedom for a periodic structure, and a production method thereof.

It is another object of the present invention to provide an optical circuit that has a high wavelength resolution and less dependence on polarization and can be miniaturized, using the optical element.

An optical element of the present invention includes a structure having at least one convex portion and at least one concave portion formed so as to be adjacent to one of the convex portions, at least one surface of the structure being covered, the optical element having a hollow portion, wherein the at least one surface of the structure is covered with a covering layer formed by a deposition process. According to this configuration, a hollow portion in a desired shape can be produced. Furtherniore, and optical element thus produced is very small with a low loss. Furthermore, the structure is covered with the covering layer, so that an optical element with high durability is realized. As the deposition process, general chemical vapor deposition (DVD) (including plasma CVD) desirably is used. Furthermore, physical vapor deposition (PVD), flame hydrolysis deposition (FHD), and the like also can be used. It is desirable to use a method that basically has no directivity in a deposition process and has a relatively high deposition rate or to adapt a method to promote such a condition.

Furthermore, the optical element of the present invention may include a substrate, and the structure may be placed on the substrate.

Furthermore, the optical element of the present invention further may include a substrate and a solid layer stacked on the substrate, and the structure may be placed on the solid layer.

Furthermore, preferably, at least one of the convex portion and the concave portion is disposed so as to have a periodic structure. According to this configuration, the optical element can control light. For example, the optical element functions as a diffraction grating. The optical element also functions as a photonic crystal.

Furthermore, at least one of the convex portion and the concave portion may be disposed so as to have a one-dimensional periodic structure.

Furthermore, at least one of the convex portion and the concave portion may be disposed so as to have a two-dimensional periodic structure.

Furthermore, the convex portion preferably has a multi-layered structure. According to this configuration, an optical element capable of controlling light even in a multi-layered stack direction can be realized.

Furthermore, the number of the convex portion may be one, and a plurality of the concave portions may be formed.

Furthermore, preferably, the optical element of the present invention includes a plurality of the optical elements, and the plurality of optical elements are stacked. This enables complex control of light to be performed. Furthermore, since the hollow portion is covered with the covering layer formed by a deposition process, the optical element with a small distance between hollow portions and a small loss is realized.

Furthermore, preferably, the optical element of the present invention further includes an optical component for controlling light, and the optical component is placed on the structure. This enables complex control of light to be performed.

Furthermore, the optical component may be at least one selected from the group consisting of a lens, a mirror, and an optical waveguide.

Furthermore, the convex portion and the concave portion are arranged periodically in an alternating manner, a depth of the concave portion is larger than ½ the width of the concave portion, and an arrangement period between the convex portion and the concave portion of the structure is in a range of 1/20 times to 20 times a wavelength of light to be used. Since the depth of the concave portion is larger than ½ times the width of the concave portion, a hollow portion is formed without filling the concave portion with the covering layer. Furthermore, since the arrangement period of the convex portion and the concave portion of the structure is in a range of 1/20 times to 20 times the wavelength of light to be used, the optical element is applicable to, for example, a diffraction grating, a photonic crystal, a polarizer, or a antireflection structure. In particular, by forming a periodic structure composed of a solid and a gas (or a vacuum) by using the convex portion and the concave portion, each respective refractive index difference is increased to enhance the performance of the optical element.

Furthermore, preferably, the depth of the concave portion is twice or more the width of the concave portion. According to this configuration, an optical element having a hollow portion can be realized without filling the concave portion with the covering layer.

Furthermore, preferably, the optical element of the present invention further includes an upper cladding layer, a lower cladding layer, and a core layer having a refractive index higher than those of the upper cladding layer and the lower cladding layer, wherein the core layer is interposed between the upper cladding layer and the lower cladding layer, and the structure is placed in the core layer. According to this configuration, the optical element has an optical waveguide structure. Therefore, light is allowed to propagate in a single mode, the polarization dependency can be reduced, and a coupling loss with an optical fiber can be reduced.

Furthermore, an optical circuit of the present invention includes the optical element wherein the structure is a diffraction grating for first-order diffracting incident light, an incident portion, and a focusing portion, wherein the incident portion controls a spread angle of light incident upon the optical element, the focusing portion focuses light demultiplexed to light having a plurality of different wavelength components by the optical element, and the incident portion and the focusing portion are placed in the core layer. According to this configuration, the optical circuit functions as an optical demultiplexer. Therefore, a small optical demultiplexer with high performance can be realized.

Furthermore, at least one of the incident portion and the focusing portion may be a concave mirror.

Furthermore, preferably, the concave mirror is formed of an interface between the core layer and a space formed in the core layer. According to this configuration, the step of placing a concave mirror using deposition of metal can be omitted, and the number of components can be reduced, so that the optical circuit can be produced easily.

Furthermore, preferably, the incident portion and the focusing portion are concave mirrors, the concave mirrors are formed of an interface between the core layer and a space formed in the core layer, and a shape of the interface between the core layer and the space forming the concave mirror is a part of a parabolic surface. According to this configuration, focusing characteristics without an aberration can be obtained in a concave mirror.

Furthermore, preferably, the incident portion and the focusing portion are concave mirrors, and assuming that an incident angle of light to a concave mirror that is the incident portion is $\alpha_1$, an incident angle of light to a concave mirror that is the focusing portion is $\alpha_2$, an incident angle of light incident upon the structure that is the diffraction grating is $\beta_1$, an output angle of light output from the structure that is the diffraction grating is $\beta_2$, a grating period of the structure that is the diffraction grating is a, a minimum channel spacing is $\Delta\lambda$, a central wavelength is $\lambda_0$, and a diffraction order is m, the following conditions are satisfied:

a width of the structure that is the diffraction grating capable of diffracting light is equal to $2a \cdot (\lambda_0/\Delta\lambda)/m$ or more a width of the concave mirror that is the incident portion capable of reflecting light is equal to $2a \cdot \cos\beta_1 \cdot (\lambda_0/\Delta\lambda)/(m \cdot \cos\alpha_1)$ or more, and a width of the concave mirror that is the focusing portion capable of reflecting light is equal to $2a \cdot \cos\beta_2 \cdot (\lambda_0/\Delta\lambda)/(m \cdot \cos\alpha_2)$ or more.

According to the above configuration, an optical demultiplexer with a minimum size having a desired optical demultiplexing property can be realized.

Furthermore, the incident portion and the focusing portion may be concave mirrors, and the optical circuit may include a light input portion for allowing light to be incident upon the incident portion that is the concave mirror, and a plurality of light output portions for combining a plurality of light beams output from the focusing portion that is the concave mirror.

Furthermore, the light input portion and the light output portion are placed in the core layer. According to this configuration, light is allowed to propagate in a single mode. In addition, polarization dependency can be reduced, and a coupling loss with an optical fiber can be reduced.

Furthermore, a method for producing an optical element of the present invention includes covering at least one surface of a structure having at least one convex portion and at least one concave portion formed so as to be adjacent to either one of the convex portions, wherein the at least one surface of the structure is covered with a covering layer formed by a deposition process. According to this configuration, a hollow portion in a desired shape can be produced. Therefore, an optical element with high performance can be produced easily.

Furthermore, after the structure is provided on a substrate or on a solid layer stacked on the substrate, at least one surface of the structure may be covered with a film formed by a deposition process.

Furthermore, the deposition process is at least one selected from the group consisting of chemical vapor deposition, physical vapor deposition, and frame hydrolysis deposition.

Furthermore, preferably, the convex portion and the concave portion of the structure are formed by photolithography or etching. According to this configuration, an optical element can be produced with precision.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

Embodiment 1

Figure 1A:
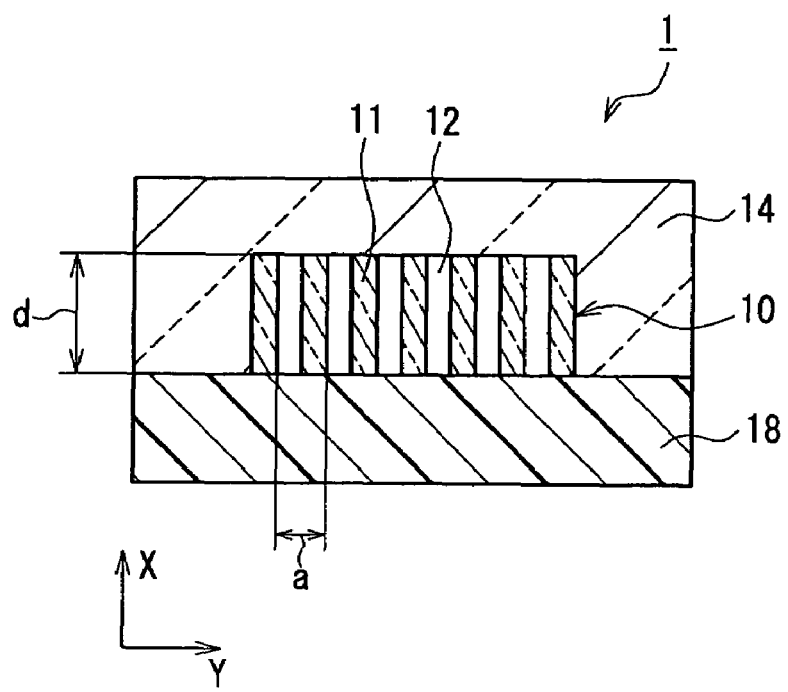
FIG. 1A is a cross-sectional view showing a configuration of an optical element according to Embodiment 1 of the present invention.
Figure 1B:
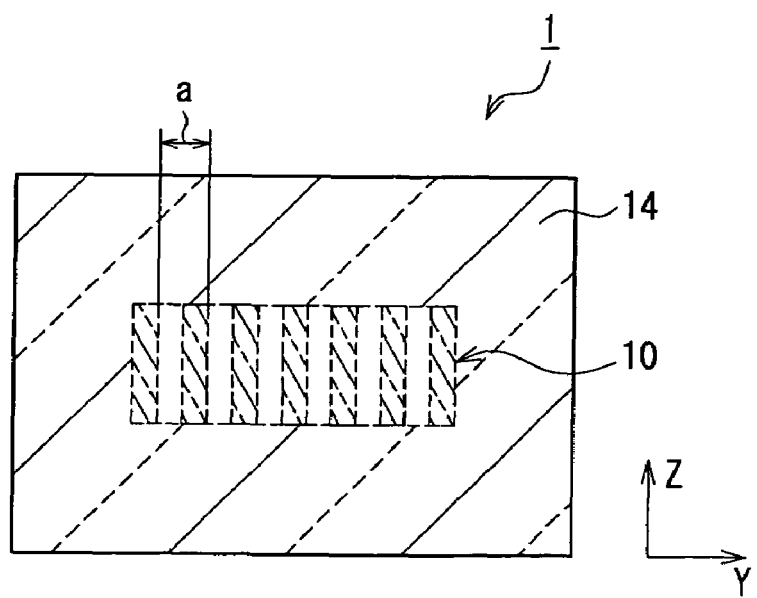
FIG. 1B is a plan view of the optical element according to Embodiment 1 of the present invention.

FIG. 1A is a cross-sectional view showing a configuration of an optical element 1 according to Embodiment 1 of the present invention. FIG. 1B is a plan view of the optical element 1 according to Embodiment 1 of the present invention. A structure 10 includes a substrate 18, ridges 11 that are convex portions formed on the substrate 18, and grooves 12 that are concave portions formed between the ridges 11. The structure 10 is a periodic structure in which the ridges 11 and the grooves 12 are arranged periodically, and a covering layer 14 is formed so as to cover the structure 10. Although the structure 10 is covered with the covering layer 14, the covering layer 14 is not incorporated in the grooves 12, and the grooves 12 are hollow. In FIG. 1B, the structure 10 is not seen due to the covering layer 14; however, the grooves 12 are represented by a broken line for ease of understanding.

Herein, the periodic structure refers to a periodic arrangement of two kinds of materials having different refractive indexes. Examples of specific applications of the periodic structure include a diffraction grating, a photonic crystal, a polarizer, and the like. In Embodiment 1, a one-dimensional periodic structure is used, in which two kinds of materials (i.e., the ridges 11 and the grooves 12 (air)) are arranged periodically in a constant direction (Y direction).

In the case where, in the periodic structure in which materials having different refractive indexes are arranged periodically, the arrangement period is sufficiently larger than or is substantially equal to the wavelength of light incident upon the periodic structure, the optical element 1 functions as a diffraction grating that diffracts incident light. Furthermore, a periodic structure, which has an arrangement period substantially equal to the wavelength of incident light and has a sufficient length in a propagation direction of the incident light, functions as a photonic crystal.

Furthermore, in the case where the arrangement period is sufficiently smaller than the wavelength of incident light, the periodic structure functions only as a medium of an average refractive index. However, in the case where the periodic structure has anisotropy in its configuration, the periodic structure functions as a polarizer. Furthermore, in the case where the periodic structure has no anisotropy in its configuration, by designing the periodic structure so that a refractive index has a gradient continuously from its front surface to its back surface, a antireflection structure can be realized. For example, the structure 10 shown in FIG. 1A is a periodic structure with an arrangement period a.

In summary in terms of quantity, it is desirable that the period a of the structure 10 is in the following range with respect to a wavelength $\lambda$ of incident light:

$\lambda/20 \leq a \leq \lambda/10$: polarizer, antireflection structure, etc.

$\lambda/10 \leq a \leq 5\lambda$: photonic crystal, etc.

$\lambda/10 \leq a \leq 20\lambda$: diffraction grating, etc.

Thus, it is desirable that the period a of the structure 10 of Embodiment 1 satisfies all the above-mentioned ranges. That is, it is desirable that a value (=a/λ) obtained by standardizing the period a with the wavelength λ is set to be in a range of 1/20 to 20.

The optical element 1 according to Embodiment 1 has a configuration in which the structure 10 composed of a solid material (ridges 11) and a gas or a vacuum (grooves 12) is embedded in a solid material. That is, the optical element 1 has a hollow portion. The structure 10 is covered with a covering layer 14 that is a solid material, so that the durability and soil resistance of the structure 10 are high. Furthermore, since the periodic structure composed of a solid and a gas (or a vacuum) is used, the periodic structure having a large refractive index difference can be realized.

Although the structure 10 is assumed to be a periodic structure, the structure is not limited thereto. That is, the structure 10 may be the optical element 1 having a hollow portion, in such a manner that at least one ridge 11 and at least one groove 12 adjacent to either side of the ridges 11 are formed, and at least one surface among those on which the grooves 12 of the structure 10 are formed is covered with the covering layer 14. The structure 10 is covered with the covering layer 14 formed by a deposition process.

Figure 2A:
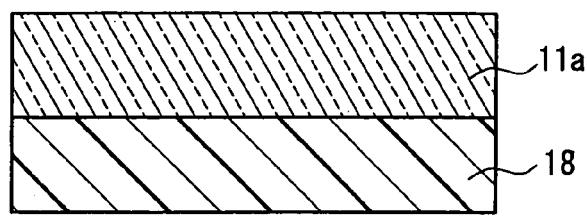
FIG. 2A is a cross-sectional view showing production processes of the optical element according to Embodiment 1 of the present invention.

Hereinafter, a method for producing the optical element 1 according to Embodiment 1 will be described with reference to FIGS. 2A, 2B, 2C, and 2D. FIGS. 2A, 2B, 2C, and 2D are cross-sectional views showing production processes of the optical element according to Embodiment 1. As shown in FIG. 2A, a solid material 11a is formed on a substrate 18. Herein, as the substrate 18, multi-component glass such as silica, silicon, or borosilicate glass may be used. Furthermore, as the solid material 11a, silica, silicon, silicon nitride, titanium oxide, tantalum oxide, or the like may be used. Furthermore, PMMA, polyimide, or the like may be used.

Figure 2B:
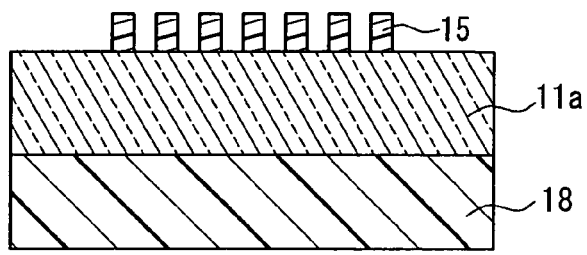
FIG. 2B is a cross-sectional view showing production processes of the optical element according to Embodiment 1 of the present invention.
Figure 2C:
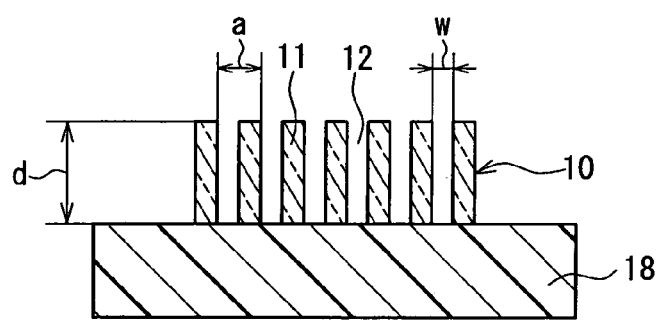
FIG. 2C is a cross-sectional view showing production processes of the optical element according to Embodiment 1 of the present invention.
Figure 2D:
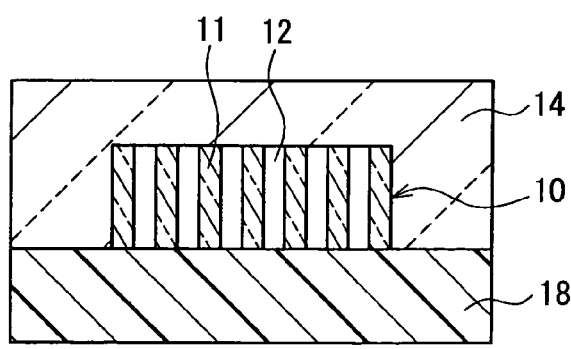
FIG. 2D is a cross-sectional view showing production processes of the optical element according to Embodiment 1 of the present invention.

As shown in FIG. 2B, a metal mask 15 is formed on the solid material 11a. The metal mask 15 is positioned so that a desired structure can be formed. As shown in FIG. 2C, portions of the solid material 11a other than those corresponding to the metal mask 15 are removed, and the metal mask 15 also is removed. As a result, a structure 10 composed of ridges 11 and grooves 12 is formed. As shown in FIG. 2D, the structure 10 is covered with a covering layer 14 from an upper surface of the structure 10 by using a deposition process.

Thus, the optical element 1 can be produced. However, there is a possibility that the grooves 12 may be filled with the covering layer 14 when the structure 10 is covered with the covering layer 14. If the grooves 12 are filled with the covering layer 14, a desired structure 10 will not be produced. Therefore the grooves 12 need to be prevented from being filled with the covering layer 14.

The inventors of the present invention investigated the relationship between the incorporation of a film into grooves in the course of formation of the film on the structure 10 and the shape of the periodic structure. For a test purpose, a one-dimensional periodic structure was used, in which linear grooves having different groove depth/groove width ratios (aspect ratios) are arranged at equal intervals. As shown in FIG. 2C, the structure 10 was formed by lithography and dry etching. As a deposition process for covering the structure 10 with the covering layer 14, a plasma chemical vapor deposition (plasma CVD) widely used for forming a dielectric film made of silica or silicon nitride was used. As a result, it was found that, in general, the incorporation of the covering layer 14 into the grooves 12 largely depends upon an aspect ratio. The relationship can be expressed as shown below.

An aspect ratio AR is defined by the following expression:

$$AR = d/w$$

where d is a groove depth in the grooves 12 in a vertical direction with respect to the substrate 18 surface, and w is a groove width in a direction parallel to the substrate 18 surface in an upper portion of the grooves 12 (see FIG. 2C). At this time, depending upon the value of the aspect ratio AR, the incorporation of the covering layer 14 into the grooves 12 was changed as follows. Silica is used for the covering layer 14.

When $AR \leq 0.5$, the grooves 12 are filled with the covering layer 14 completely.

When $0.5 < AR < 2$, the grooves 12 are filled with the covering layer partially; however, a hollow portion also remains.

When $2 \leq AR$, the groove shape of the grooves 12 before forming a film is maintained as it is.

As described above, in order for the grooves 12 to be hollow, it is necessary to form the grooves 12 with a high aspect ratio. With the grooves having an aspect ratio larger than about 0.5, the covering layer 14 is formed on side walls or bottoms of the grooves 12 in some degree; however, a gas layer (hollow portion) reflecting the shape of the grooves 12 and the aspect ratio can be formed. Furthermore, by setting the aspect ratio of the grooves 12 to be 2 or more, a structure maintaining an initial shape can be formed without the covering layer 14 being incorporated in the grooves 12. Thus, it is preferable that the aspect ratio is set to be 2 or more in view of the production precision for the periodic structure. As the aspect ratio is larger, intrusion of the covering layer 14 into the grooves 12 can be suppressed more. Therefore, the initial groove shape of the grooves 12 is likely to be maintained. For example, when the aspect ratio is 100, the initial groove shape of the grooves 12 can be maintained easily.

Hereinafter, examples of production of the optical element 1 by using a one-dimensional periodic structure will be described.

EXAMPLE 1

Figure 3:
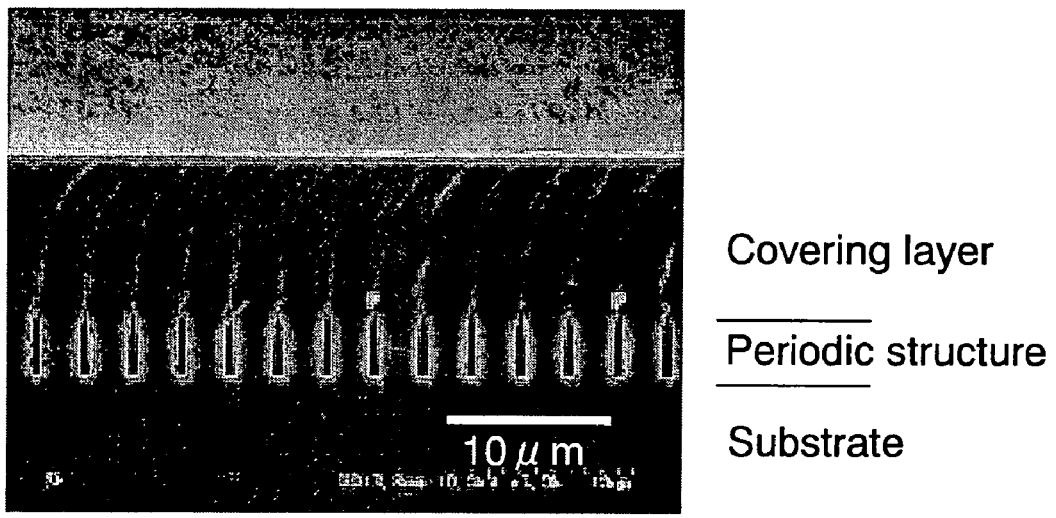
FIG. 3 is a scanning electron micrograph showing a cross-section of an optical element of Example 1.

An optical element 1 with a one-dimensional periodic structure embedded therein was produced by the following procedure, as shown in FIGS. 2A to 2D. A line-shaped metal mask 15 was formed at an equal interval on a solid material 11a formed on a substrate 18. Thereafter, ridges 11 and grooves 12 were formed of the solid material 11a by dry etching. At this time, the ridges 11 and the grooves 12 were formed alternately so as to have a one-dimensional periodic structure. A period a in the structure 10 thus produced was 3 μm, a groove depth d was 4 μm, and an aspect ratio AR was 3. Silica to be the covering layer 14 was formed on the surface of the structure 10 by plasma CVD. FIG. 3 shows a scanning electron micrograph of a cross-section of the optical element 1 after forming the covering layer 14. As is apparent from FIG. 3, the structure 10 is positioned under the covering layer 14 made of silica. Furthermore, it is confirmed that the covering layer 14 is not incorporated in the grooves 12. Thus, it was verified that the optical element 1 with a one-dimensional periodic structure embedded therein can be formed.

Furthermore, as is understood from the scanning electron micrograph shown in FIG. 3, since an upper surface of the covering layer 14 is flat, various applications can be performed as follows: various functional elements are formed on the covering layer 14, and these elements are stacked repeatedly to be integrated.

In the above example, the production of a one-dimensional periodic structure by forming grooves with a constant period on a homogeneous substrate has been described. According to the present example, a two-dimensional or three-dimensional periodic structure also can be produced. A two-dimensional periodic structure in which grooves orthogonal to each other are formed on a homogenous substrate using an orthogonal linear mask, and a two-dimensional or three-dimensional periodic structure in a vertical plane of a substrate in which grooves are formed on a multi-layered film instead of a homogenous substrate, and the like can be produced.

In the optical element 1 of Embodiment 1, as a method for forming the covering layer 14 so as to cover the structure 10, general chemical vapor deposition (including plasma CVD) desirably is used. Furthermore, physical vapor deposition (PVD), flame hydrolysis deposition (FHD), and the like also can be used. It is desirable to use a method that basically has no directivity in a deposition process and has a relatively high deposition process speed or to adapt a method to promote such a condition. As a material for the covering layer 14, it is desirable to use a silica material because of high stability and low refractive index. In the case where a multi-layered film is formed in a direction vertical to the substrate 18 surface, it is preferable to use a material suitable for each application in view of a refractive index and a transmittance.

In the case where the thickness of the covering layer 14 should be minimized, it is preferable to use general sputtering in PVD. Sputtering is roughly classified into a plasma method and an ion beam method. The plasma method is more preferable in that a film formation component has no directivity. The plasma method also has an advantage in that film formation in a large area at a high speed is possible.

Furthermore, depending upon the reaction mechanism of sputtering, sputtering is classified into physical sputtering, chemical sputtering, and reactive sputtering. Any of them may be used. Furthermore, a plasma generation method includes a direct current type, an RF type, a magnetron type, and the like. There is no particular limit thereto. They may be used in accordance with the kind and optical characteristics of the covering layer 14 to be formed.

EXAMPLE 2

An optical element 1 of Example 2 according to Embodiment 1 will be described. The optical element 1 of Example 2 is, for example, a high-functional diffraction grating. In the optical element 1 of Example 2, as shown in FIG. 2B, a mask pattern was formed on a solid material 11*a*, using a metal mask 15 by electron beam drawing and lift-off of Ni. Thereafter, ridges 11 and grooves 12 were formed of the solid material 11*a* by dry etching of Inductively Coupled Plasma-RIE (ICP-RIE).

Figure 4:
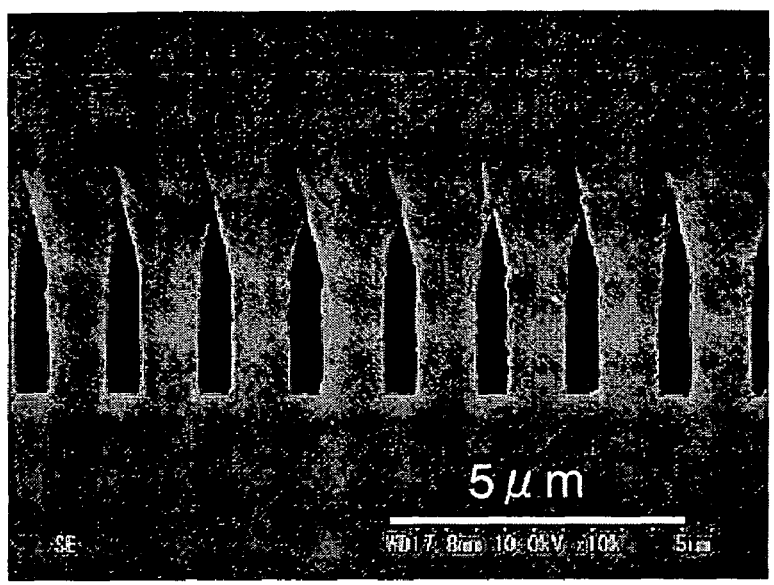
FIG. 4 is a scanning electron micrograph showing a cross-section of an optical element of Example 2.

For film formation, RF sputtering was performed, using silica as a target for a covering layer 14. FIG. 4 shows a scanning electron micrograph of a cross-section of the optical element 1 produced in Example 2. A structure 10 is a diffraction grating that is a periodic structure. It is understood from FIG. 4 that the groove width hardly is reduced by film formation, and the covering layer 14 can be suppressed from being incorporated into the grooves 12. The diffraction grating that is the structure 10 of Example 2 exhibited satisfactory characteristics such as a first diffraction efficiency of 90% or more, and a loss of 5% or less due to polarization. Furthermore, the mechanical strength of the diffraction grating was enhanced due to embedding (film formation).

As described above, the film formation by sputtering is effective for embedding while suppressing the film formation in the grooves 12, and a shift in a configuration from a design value due to embedding can be reduced.

On the other hand, CVD that is another deposition process includes thermal CVD, plasma CVD, and the like. By using the CVD, a wide variety of films (including a semiconductor, an insulator, and metal), such as amorphous silicon, a silicon oxide, a silicon nitride, and the like, can be obtained. Furthermore, the CVD has features such as a high film formation speed and a large film formation area.

Particularly, in optical communication, the CVD is used for forming a silica film doped with various impurities. For example, by doping a silica film with germanium, the refractive index thereof can be enhanced so that the silica film functions as an optical waveguide, and by doping a silica film with fluorine, the refractive index thereof is decreased. Furthermore, by doping a silica film with boron or phosphorus, the softening point thereof can, be decreased. Thus, by doping a silica film with various elements by using the CVD, the physical property of the film can be controlled.

Furthermore, according to the CVD, depending upon the material for film formation and the film formation condition, the amount of the covering layer 14 to be incorporated into the grooves 12 in the course of formation of the covering layer 14 is varied as shown in FIG. 2D. Therefore, it is preferable to make use of this phenomenon. More specifically, a film is formed of a material having a softening point lower than that of the structure 10, and thereafter, the shape of the structure 10 is controlled by heat treatment. This will be described in Example 3.

EXAMPLE 3

In an optical element 1 of Example 3, a film is formed on a structure 10 by using plasma CVD. By using the plasma CVD, the shape of the structure 10 is controlled. In the same way as in Examples 1 and 2, as shown in FIG. 2C, ridges 11 and grooves 12 were formed on a substrate 18. Thereafter, as shown in FIG. 2D, silica with 14 mol % of boron added thereto was formed as a covering layer 14 by the plasma CVD, whereby the optical element 1 was produced. The reason for doping silica with boron is to decrease a glass transition point of silica. Thereafter, the optical element 1 was heat-treated for one hour in the air at 800° C. As a result, the gas in a space formed by the grooves 12 of the structure 10 and the covering layer 14 was expanded to control the shape of the grooves 12 of the structure 10.

Figure 5:
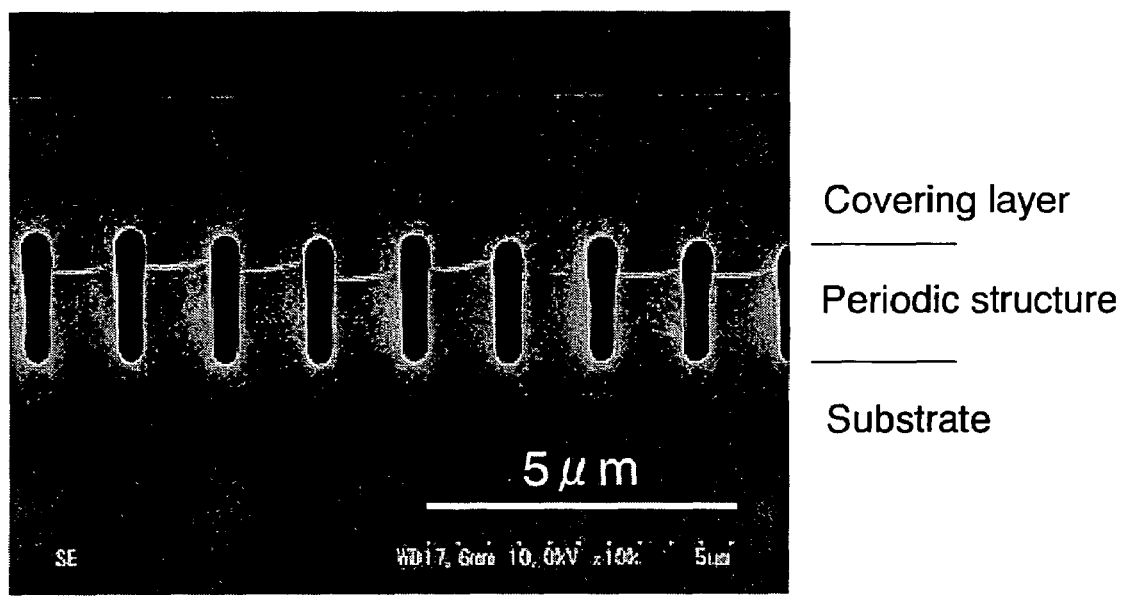
FIG. 5 is a scanning electron micrograph showing a cross-section of an optical element of Example 3.

FIG. 5 shows a scanning electron microscope of a cross-section of the optical element 1 after heat treatment in Example 3. The above-described periodic structure of Example 2 (see FIG. 4) has a configuration in which ends (upper side in FIG. 4) of the grooves are pointed due to film formation. However, in Example 3, because of the heat treatment, as shown in FIG. 5, the cross-sectional shape of the grooves 12 was able to be formed into an oval shape. This is considered to occur as follows: due to the thermal expansion of the gas in the space (i.e., the grooves 12 of the structure 10), only silica doped with boron was pressurized. Thus, by controlling a depth d and a groove width w of the grooves 12, a film formation component, and a heat treatment condition, a periodic structure having a particular shape, which used to be difficult in a conventional example, can be formed. This also allows production of the optical element 1, for example, in which spherical spaces are arranged.

In the optical element 1 according to Embodiment 1 shown in FIG. 1A, there is no particular limit to a material forming a periodic structure (i.e., the structure 10), and a dielectric, a semiconductor, metal, an organic material, or the like can be used. However, due to the use of a film formation procedure at a relatively high temperature for forming a covering layer 14 as described above, it is desirable to use a thermally stable inorganic material.

Hereinafter, specific examples of the material will be listed. As the material for the substrate 18, for example, oxide glass such as soda-lime glass and borosilicate glass, non-oxide glass such as chalcogenide glass and halogenide glass, and mixed glass such as oxynitride glass and chalcohalide glass may be used. Furthermore, silica, silicon, silicon nitride, silicon carbide, silica doped with B, P, Ge, F, Ti, or the like, and a material that can be formed into a film by vacuum film formation, such as a semiconductor (InP, GaAs, etc.) also can be used as the material for the substrate 18. In some cases, a polymer such as PMMA, a film formed by a sol-gel method, and the like also are applicable.

Furthermore, a multi-layered film may be used as the substrate 18. More specifically, an optical multi-layered film made of silica, titania, tantalum oxide, silicon, silicon nitride, alumina oxide, magnesium fluoride, or the like may be used as the substrate 18.

The above-mentioned materials also can be used as that for forming the structure 10. Furthermore, silica and a material that can be formed into a film by vacuum film formation, such as a semiconductor, are applicable to the covering layer 14.

Furthermore, for processing the structure 10, it is desirable to apply a lithography and etching technique. Therefore, materials with high processing precision, such as a dielectric (silica, silicon nitride, titania, etc.), and a semiconductor (silicon, InP, etc.) are desirable.

The structure 10 according to Embodiment 1 shown in FIG. 1A has a configuration in which a solid material (ridges 11) and a gas (grooves 12) are arranged periodically. Therefore, its refractive index difference is large (i.e., 30% or more). More specifically, the refractive index difference is represented by (Refractive index of a solid material—Refractive index of air)/Refractive index of a solid material× 100 (%). For example, in the case where a solid material (ridges 11) is silica, since its refractive index is 1.5, the refractive index difference is determined to be about 30%, using the refractive index of air (i.e., 1). Thus, the solid material of silica is preferable in the case where such a large refractive index difference is required, or in the case of producing the optical element 1 (e.g., a photonic crystal, a polarized beam splitter, or a high-efficiency transmission type diffraction grating) that has improved performance when the refractive index difference is larger. Furthermore, if silicon nitride or a material with a high refractive index such as a semiconductor is used as the ridges 11, the refractive index difference can be enlarged further. In contrast, a sufficiently large refractive index difference can be ensured even in silica with a low refractive index, so that it is preferable to produce an optical element 1 using a chemically and physically stable silica material.

Embodiment 2

Figure 6A:
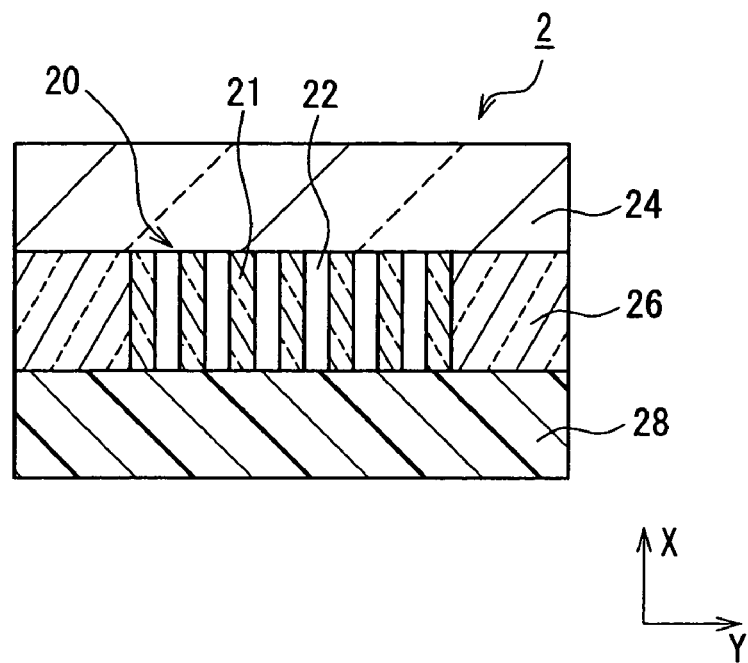
FIG. 6A is a cross-sectional view of an optical element according to Embodiment 2 of the present invention.
Figure 6B:
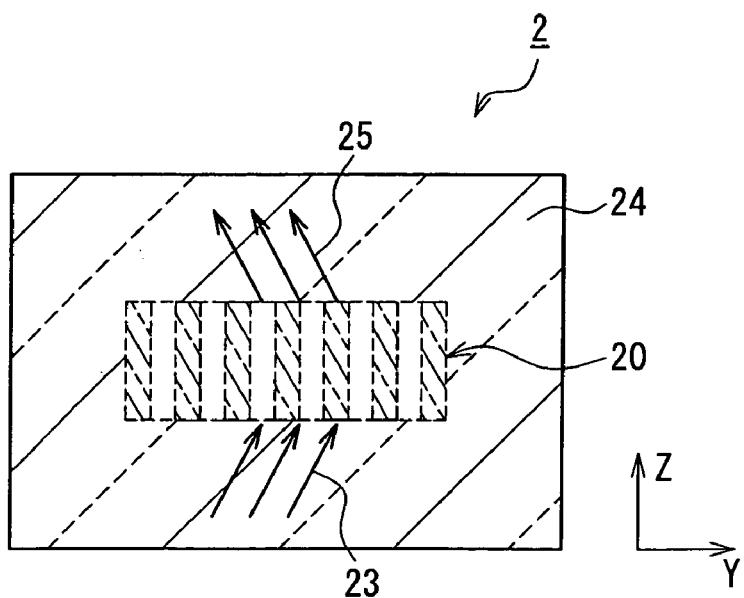
FIG. 6B is a plan view of the optical element according to Embodiment 2 of the present invention.

An optical element 2 according to Embodiment 2 of the present invention has an optical waveguide structure. A periodic structure is placed in the optical waveguide. FIG. 6A is a side cross-sectional view of the optical element 2 according to Embodiment 2. FIG. 6B is a plan view of the optical element 2 according to Embodiment 2. As shown in FIG. 6A, a core 26 is provided on a lower cladding layer 28 formed on a substrate (not shown), and an upper cladding layer 24 covers the core 26. A structure 20 is formed in a part of the core layer 26. The structure 20 is configured by a one-dimensional periodic arrangement of solid ridges 21 and an air gap made of grooves 22. In Embodiment 2, the structure 20 is a periodic structure having a one-dimensional periodic arrangement, but is not limited thereto. The lower cladding layer 28 may be replaced by a substrate.

The refractive index of the core layer 26 is set to be larger than those of the upper cladding layer 24 and the lower cladding layer 28, whereby an optical waveguide structure is formed. Light introduced into the core layer 26 is confined in the core layer 26 to propagate therethrough. As shown in FIG. 6B, when incident light 23 is incident in parallel with the structure 20 formed in the optical waveguide, the incident light 23 is output from the structure 20 as diffracted light 25 having a diffraction angle determined by the wavelength of the incident light 23, the period of a diffraction grating, and the refractive index of the core layer 26. More specifically, the structure 20 functions as a diffraction grating. The diffracted light 25 propagates through the core layer 26 again. In FIG. 6B, the structure 20 is not seen due to the upper cladding layer 24; however, for ease of understanding, the structure 20 is represented by a broken line.

The optical element 2 according to Embodiment 2 can allow light to propagate therethrough in an in-plane direction, not in a direction vertical to the lower cladding layer 28 (substrate) as in an optical system using a conventional diffraction grating. Because of this, for example, the optical element 2 can be used as an optical circuit, whereby integration and miniaturization can be realized.

EXAMPLE 4

Example 4 specifically exemplifying the optical element 2 of Embodiment 2 will be described with reference to FIGS. 6A and 6B.

In Example 4, an optical element 2 with an optical waveguide structure capable of allowing light to propagate in a single mode was produced under the following conditions:

| | |
|---|---|
| Wavelength of light to be used | 1.55 µm |
| Upper cladding layer 24 | Silica (refractive index 1.455) |
| Lower cladding layer 28 (substrate) | Silica (refractive index 1.455) |
| Core layer 26 | Ge-doped silica (refractive index 1.460), thickness 5 µm |

If the upper cladding layer 24 is not formed, the thickness of the core layer 26 for obtaining a single mode is 1 µm or less. As a result, it becomes difficult to couple input/output light with respect to an outside, and due to a large refractive index difference or distortion, polarization dependency and a propagation loss at an interface necessarily are increased. That is, by forming the upper cladding layer 24, the propagation of light in a single mode, in which a wavefront of propagation light is easily controlled, can be obtained with practical design values. The formation of the upper cladding layer 24 also is preferable in terms of protection, durability, and soil resistance of the structure 20.

Herein, assuming that the structure 20 of the optical element 2 of Example 4 is a transmission-type diffraction grating at a period of about a wavelength of light to be used, by setting a sufficient thickness of the structure 20 in a light propagation direction, light and the structure 20 interact with each other. The characteristics of a rectangular groove diffraction grating made of silica as in the structure 20 were obtained by simulation. Consequently, in the case of using light having a wavelength of 1.46 to 1.58 µm, very excellent characteristics, such as a polarization dependency loss PDL (=10×$log_{10}$ (first diffraction efficiency in TE polarized light/ first diffraction efficiency in TM polarized light) of 0.1 dB or less, and a first diffraction efficiency of 94% or more, were obtained. For simulation, a program (GSOLVER ver4.20b produced by Grating Solver Development) was used in an RCWA (Rigorous Coupled Wave Analysis) method.

Conditions used for calculation in the above-mentioned simulation are as follows:

Refractive index of the ridges 21: 1.46 (value at a wavelength of 1.55 µm for light to be used Refractive index of the grooves 22: 1.00 (value at a wavelength of 1.55 µm for light to be used Width of the ridges 21: 0.85 µm Groove width of the grooves 22: 0.60 µm Width in a light propagation direction: 3.15 µm Incident angle with respect to the structure 20: 20°

The width in a light propagation direction refers to the length of the structure 20 in a Z direction.

Light guided by an optical fiber is variously polarized depending upon the state of the optical fiber, so that it is actually difficult to predict a polarized state. Therefore, a component for controlling a polarization direction should be added to a system, which necessarily leads to an increase in cost. The optical element 2 of Embodiment 2 has an optical waveguide structure. Therefore, when it is used for optical communication, a loss depending upon polarization can be suppressed, which is very advantageous for configuration of optical communication systems. Herein, the optical element 2 having a diffraction grating in a rectangular shape has been exemplified. However, excellent characteristics can be obtained with various shapes of a diffraction grating, such as a triangular shape, a pointed shape, and the like, so that the shape of the diffraction grating is not particularly limited (see J. Koyama and H. Nishihara, "Lightwave Electron Optics", Corona Co., Ltd., 1978, Ch. 4).

The above-mentioned performance of the structure 20 (diffraction grating) of the optical element 2 can be realized by a periodic structure of materials with refractive indexes 1.46 and 1.00. Therefore, a technique of embedding the grooves 22 in the optical element 2 as hollow portions is required. In the case of propagating light in an optical communication wavelength band (in the vicinity of a wavelength of 1.3 to 1.5 µm), the thickness of a silica waveguide (thickness of the core layer 26) is about 5 µm. Therefore, the aspect ratio of a grating groove (grooves 22) is about 8. Accordingly, the structure 20 composed of the grooves 22 and the ridges 21 as described in Example 1 is covered with the upper cladding layer 24, whereby a transmission-type diffraction grating embedded in the optical element 2 can be produced.

In the optical element 2 of Embodiment 2, there is no particular limit to the material for the core layer 26. Generally, Ge-doped silica may be used. For example, the core layer 26 can be formed by using silicon nitride or silicon with a high refractive index. However, in the case where the optical element 2 is used as an optical demultiplexer for optical communication, it is preferable that silica/Ge-doped silica based optical waveguide (upper cladding layer 24, lower cladding layer 28, and core layer 26), which is advantageous in terms of performance and connection with the outside, is used so that the thickness of the core layer 26 is about 5 µm.

As described above, by using the structure 20 (transmission-type diffraction grating) having a period of about a wavelength and a volume effect as in the optical element 2 of Embodiment 2, the optical element 2 can be realized, which is advantageous in polarization dependency and connection with an optical fiber, and excellent in diffraction characteristics. The core layer 26 and the ridges 21 may be made of the same material or different materials.

Embodiment 3

Figure 7A:
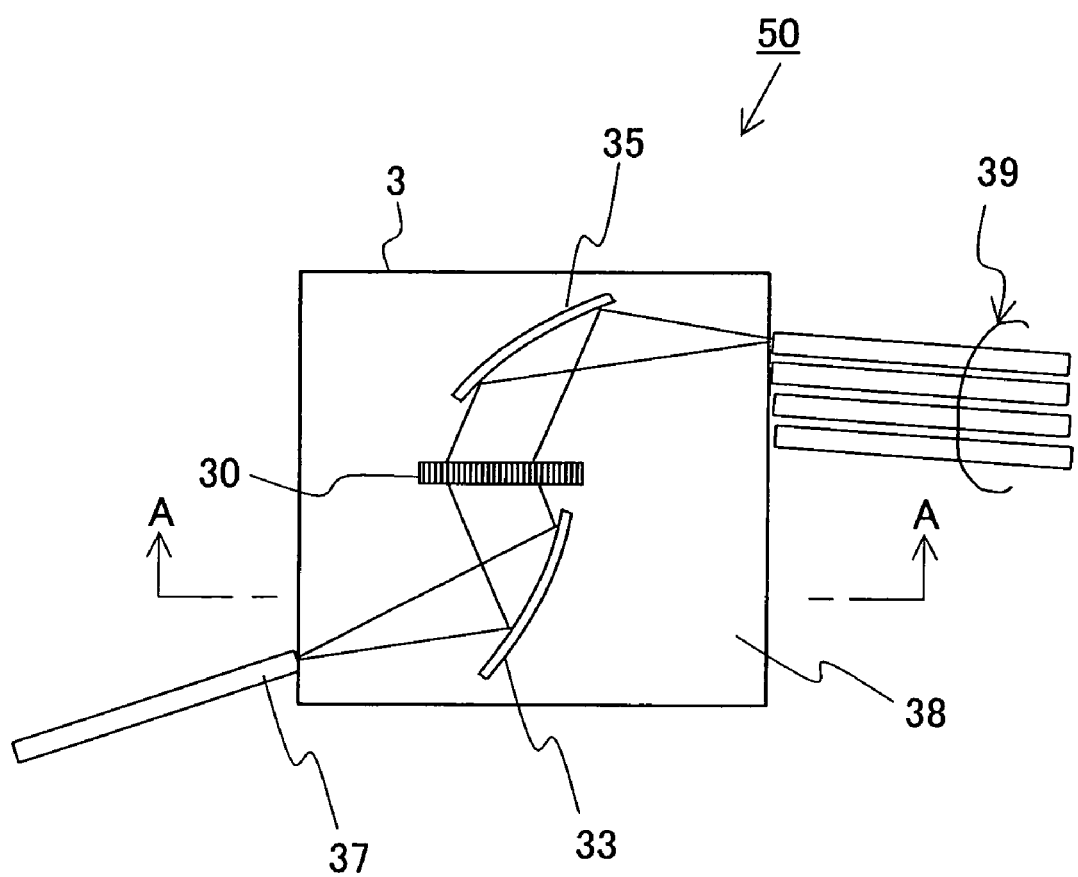
FIG. 7A is a schematic plan view of an optical circuit constituting an optical demultiplexer.

An optical circuit 50 according to Embodiment 3 of the present invention will be described with reference to FIG. 7A. The optical circuit 50 according to Embodiment 3 includes at least one optical element 3 provided with a diffraction grating 30 that first-order diffracts at least incident light, at least one incident portion 33, and at least one focusing portion 35.

More specifically, the optical element 3 may be the optical element 2 including the structure 20 that is a diffraction grating and the core layer 26 according to Embodiment 2 shown in FIGS. 6A and 6B. Furthermore, the incident portion 33 has functions of controlling a spread angle of light incident upon the optical element 3, and focusing light demultiplexed to a plurality of different wavelength components by the diffraction grating 30. The diffraction grating 30 demultiplexes incident light having a plurality of wavelengths on the wavelength basis.

The optical element 3 includes the diffraction grating 30 that is a periodic structure on the substrate 38, and a core layer 31 (not shown in FIG. 7A) is formed at the periphery of the diffraction grating 30. Furthermore, a cladding layer 32 (not shown in FIG. 7A) is placed on the diffraction grating 30 and the core layer, and the diffraction grating 30 and the core layer are sandwiched between the cladding layer and the substrate 38. Actually, although the core layer 31 and the cladding layer 32 are formed on the substrate 38, they are not shown in FIG. 7A for ease of understanding.

Figure 7B:
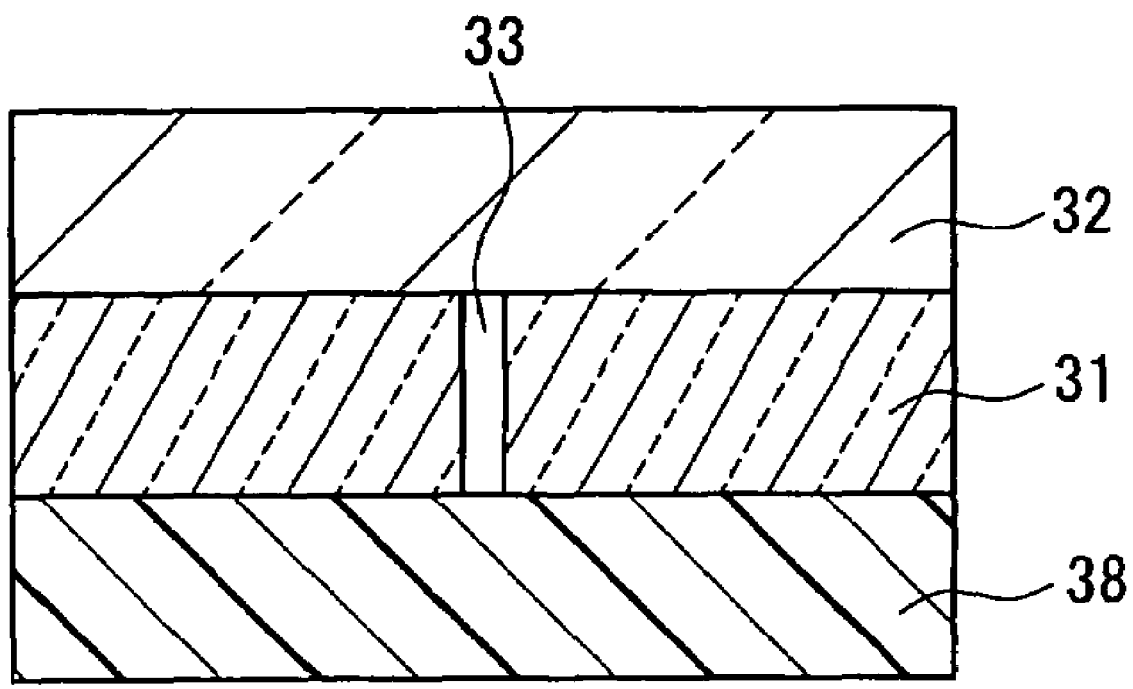
FIG. 7B is a cross-sectional view taken along an A-A line in FIG. 7A.

The incident portion 33 and the focusing portion 35 are placed in the core layer. FIG. 7B is a cross-sectional view taken along a line A-A in FIG. 7A. As shown in FIG. 7B, the core layer 31 is formed on the substrate 38. The incident portion 33 is placed in the core layer 31, and the cladding layer 32 is placed on the incident portion 33 and the core layer 31. The cladding layer 32 is not necessarily required. When the cladding layer 32 is not formed, air functions as the cladding layer 32.

EXAMPLE 5

An optical demultiplexer of Example 5 that is a specific example of the optical circuit 50 according to Embodiment 3 will be described with reference to FIGS. 7A and 7B. FIG. 7A is a schematic plan view of the optical circuit 50 constituting the optical demultiplexer. FIG. 7B is a cross-sectional view taken along a line A-A in FIG. 7A. A diffraction grating 30 is formed on a substrate 38. In a core layer 31 on the substrate 38, an incident portion 33 for allowing light to be incident upon the optical element 3, and a focusing portion 35 for focusing light passing through the optical element 3 and demultiplexed on the wavelength basis are present (see FIG. 7A). For example, the incident portion 33 and the focusing portion 35 are concave mirrors. Furthermore, the optical circuit 50 includes an light input portion 37 for allowing light to be incident upon the incident portion 33 from the outside, and a light output portion 39 for outputting light having each wavelength focused by the focusing portion 35. As the optical input portion 37, for example, an optical fiber may be used. Furthermore, since a plurality of light beams are incident upon the light output portion 39, a plurality of optical fibers may be used.

Figure 8A:
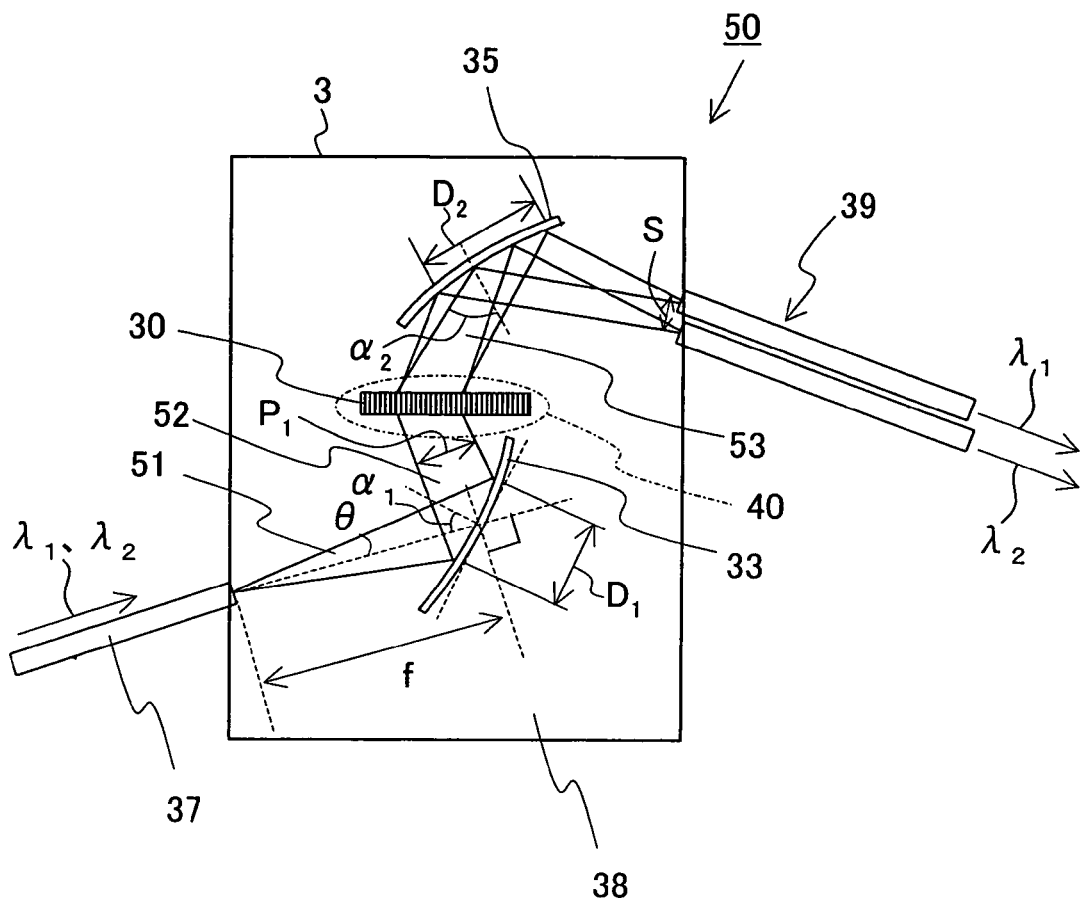
FIG. 8A is a schematic plan view showing parameters of the optical circuit.
Figure 8B:
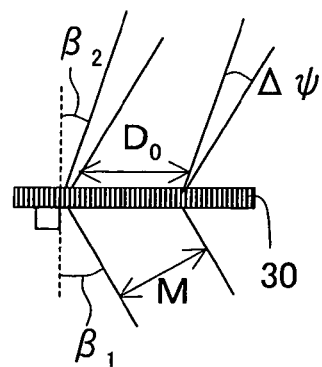
FIG. 8B is a partially enlarged view of FIG. 8A.

Next, the operation of the optical circuit 50 that is an optical demultiplexer will be described. FIG. 8A is a schematic diagram showing the optical circuit 50 of Embodiment 3 with optical parameters added thereto. Furthermore, FIG. 8B is a diagram showing an enlarged portion 40 of FIG. 8A. Light 51 incident upon a core layer (not shown) formed on the substrate 38 from the light input portion 37 propagates while spreading in a fan shape in accordance with the numerical aperture (NA) of an optical waveguide formed of the core layer (not shown) and a cladding layer (not shown). The core layer is formed on the substrate 38, and the cladding layer is formed on the core layer. The diffraction grating 30, the incident portion 33, and the focusing portion 35 are formed in the core layer. The light 51 is incident upon the incident portion 33 that is a concave mirror, and is reflected therefrom. At this time, the light 51 is reflected so as to be converted to collimated light 52 with a small spread angle. The collimated light 52 is incident upon the diffraction grating 30 at a predetermined incident angle. The incident light is demultiplexed to light 53 having different directions on the basis of a wavelength component by the diffraction grating 30, and each light is incident upon the focusing portion 35 that is a concave mirror. Each light is reflected from the focusing portion 35 that is concave mirror, and focused at different points. The focal points correspond to a plurality of optical fibers (i.e., the light output portion 39), and respective light beams are combined in each fiber.

Herein, it is assumed that light incident wavelengths in a minimum channel spacing to be separated by the diffraction grating 30 are $\lambda_1$ and $\lambda_2$, and an average wavelength thereof is $\lambda_0 (=(\lambda_1+\lambda_2)/2)$. At this time, it is assumed that the difference in angles at which light with the wavelengths $\lambda_1$ and $\lambda_2$ is diffracted by the diffraction grating 30 is $\Delta\psi$ (unit: radian). Furthermore, the minimum wavelength interval is assumed to be $\Delta\lambda (=|\lambda_1-\lambda_2|)$.

Furthermore, the NA of the optical waveguide composed of the substrate 38, the core layer (not shown), and the cladding layer (not shown), in which the diffraction grating 30 is placed, is defined by the following expression:

$$NA=(n_1^2-n_0^2)^{0.5}=n_1 \cdot \sin\theta$$

where $n_1$ is a refractive index of the core layer (not shown), and $n_0$ is a refractive index of the substrate 38 or the cladding layer (not shown). Herein, for simplicity, a symmetrical optical waveguide is assumed in which the refractive index of the cladding layer is equal to that of the substrate 38, and a refractive index difference $(n_1-n_0)$ is about 0.01. Light incident upon the core layer from the light input portion 37 that is an optical fiber propagates with a spread angle of about $\theta$.

Herein, as shown in FIGS. 8A and 8B, the parameters of the optical circuit 50 are defined as follows. FIG. 8A is a schematic plan view showing the parameters of the optical circuit 50. FIG. 8B is a partially enlarged view of FIG. 8A. It is assumed that the incident portion 33 is an incident side concave mirror, and the focusing portion 35 is an output side concave mirror. Furthermore, although the core layer of the waveguide is not shown, the core layer is formed on the substrate 38 and around the incident portion 33, the focusing portion 35, and the diffraction grating 30.

Effective diameter of the incident side concave mirror: $D_1$
Effective diameter of the output side concave mirror: $D_2$
Width of collimated light on the incident side: $P_1$
Diffraction order of the diffraction grating 30: m
Total number of grooves of the diffraction grating 30: N
Groove period of the diffraction grating 30: a
Angle between a normal to a mirror surface and an optical axis at an intersection between the optical axis and the incident side mirror surface: $\alpha_1$
Angle between a normal to a mirror surface and an optical axis at an intersection between the optical axis and the output side mirror surface: $\alpha_2$
Incident angle to the diffraction grating 30: $\beta_1$
Output angle from the diffraction grating 30: $\beta_2$
Refractive index of the core layer of the waveguide: n The refractive index n exactly is an effective refractive index by waveguide light propagating in a single mode in the optical waveguide formed of the substrate 38, the core layer (not shown) and the cladding layer (not shown), and is slightly smaller than the refractive index of the core layer measured by an ellipsometer, a refractometer, etc.

A wavelength resolution $(\lambda_0/\Delta\lambda)$ in the diffraction grating 30 is determined by a product of the diffraction order m and the total number of grooves N as follows:

$$\lambda_0/\Delta\lambda = m \cdot N$$

The above expression adopts a radius of an airydisc as a channel spacing in a far field. The airydisc refers to a bright point image obtained when light forms an image by a lens system. In order to clearly separate 2-wavelength light, an interval of about a diameter of the airydisc is required. Therefore, the following expression is assumed to be the resolution of the diffraction grating 30:

$$\lambda_0/\Delta\lambda = m \cdot N/2$$

From the above expression, the depth $D_0$ of the diffraction grating 30 is represented by $D_0=a \cdot N=2a(\lambda_0/\Delta\lambda)/m$. The width $P_1$ of light incident upon the diffraction grating 30 is represented by $P_1=D_0 \cdot \cos\beta_1=2a \cdot \cos\beta_1 \cdot (\lambda_0/\Delta\lambda)/m$. The effective diameter $D_1$ of the incident side concave mirror is represented by $D_1=P_1/\cos\alpha_1=2a \cdot \cos\beta_1 \cdot (\lambda_0/\Delta\lambda)/(m \cdot \cos\alpha_1)$. Similarly, the effective diameter $D_2$ of the output side concave mirror is represented by $D_2=2a \cdot \cos\beta_2 \cdot (\lambda_0/\Delta\lambda)/(m \cdot \cos\alpha_2)$. From the above-mentioned relationships, the minimum size of each element of the optical demultiplexer of the optical circuit 50 shown in FIGS. 8A and 8B is determined.

Furthermore, the curvatures of the concave mirrors need to be selected so that the numerical aperture $NA_1$ of the incident side concave mirror (incident portion 33) corresponding to the above $D_1$ covers the numerical aperture of the light input portion 37.

A focal point interval S of each optical fiber that is the light output portion 39 is an airydisc diameter on the output side, so that the focal point interval S is represented, using the numerical aperture $NA_2$ of the output side concave mirror (focusing portion 35), by the following expression:

$$S=1.22 \cdot \lambda_0/NA_2$$

In the case where the lower limit of a value of the focal point interval S is set by a production method of a waveguide portion or the like, it may be required that the numerical aperture $NA_2$ on the output side is decreased, and the focal point interval S is increased.

The above-described design values are set so as to minimize the entire optical circuit 50 that is an optical demultiplexer while maintaining a wavelength resolution. Thus, for example, it may be possible that the total number of grooves and the width of light are set to be larger than those described above so as to have a margin. As a result of this, the following effects can be obtained:

the value of the focal point interval S is set to be larger than that described above to reduce crosstalk; and eclipse of light at a concave mirror portion incident portion 33 and focusing portion 35) is reduced to decrease a loss.

Herein, "eclipse" refers to the phenomenon in which effective light passing through an optical system is eclipsed by a lens placed in the middle of the optical system to be cut off.

The concave mirror can be produced easily by a process of groove processing common to the periodic structure, by using an interface between the space and the material for the core layer. That is, in FIG. 7B, grooves are formed in a part of the core layer 31 formed on the substrate 38, whereby the incident portion 33 that is a concave mirror can be formed. The focusing portion 35 also can be formed similarly. Herein, the following is well known: when light propagates from a medium having a high refractive index to a medium having a low refractive index, the light is not output to the medium having a low refractive index in a certain angle range, and is totally reflected at an interface. An angle γ in such a particular angle range is called a critical angle, which is presented by the following expression:

$$\sin \gamma = n_{air}/n_1 = 1/n_1$$

where $n_{air}$ is a refractive index of air. Then, the concave mirrors are designed so that light incident upon the core layer 31 and the incident portion 33 that is a space satisfies critical angle conditions. In this case, it is not necessary to form the concave mirrors by film formation with metal, the number of components can be reduced, and the concave mirrors can be produced easily. Furthermore, the reflection loss due to total reflection becomes substantially zero in theory. The concave mirror also has a function of converting light from a focal point to collimated light (or converging collimated light to focused light). Therefore, by setting a concave curve of the concave mirror to be a part of a parabola, a complete focal point or collimated light without any aberration can be obtained. That is, the mirror surface of the concave mirror is set to be a parabolic surface.

Thus, due to the shape satisfying the above-mentioned total reflection conditions and the conditions of the parabolic surface, an optimum concave mirror with a loss minimized can be obtained.

Herein, a pair of concave mirrors are used for the incident portion 33 and the focusing portion 35. However, other optical elements that exhibit the same function (e.g., an optical waveguide lens) may be placed between the incident portion 33 and the focusing portion 35. In terms of ease of production, a concave mirror is preferable. Furthermore, one concave mirror or lens may focus propagation light. In this case, the diffraction grating 30 may be placed at any position in an optical path.

The optical circuit 50 that is an optical demultiplexer having the above-mentioned configuration has very low polarization dependency. Therefore, a polarization compensating apparatus is not required. Furthermore, due to the flat optical circuit type and miniaturized type, the optical circuit 50 can be mass-produced on a substrate with lithography alone. Thus, such an optical circuit is very preferable in the field requiring a low cost and a small space.

Embodiment 4

Figure 9:
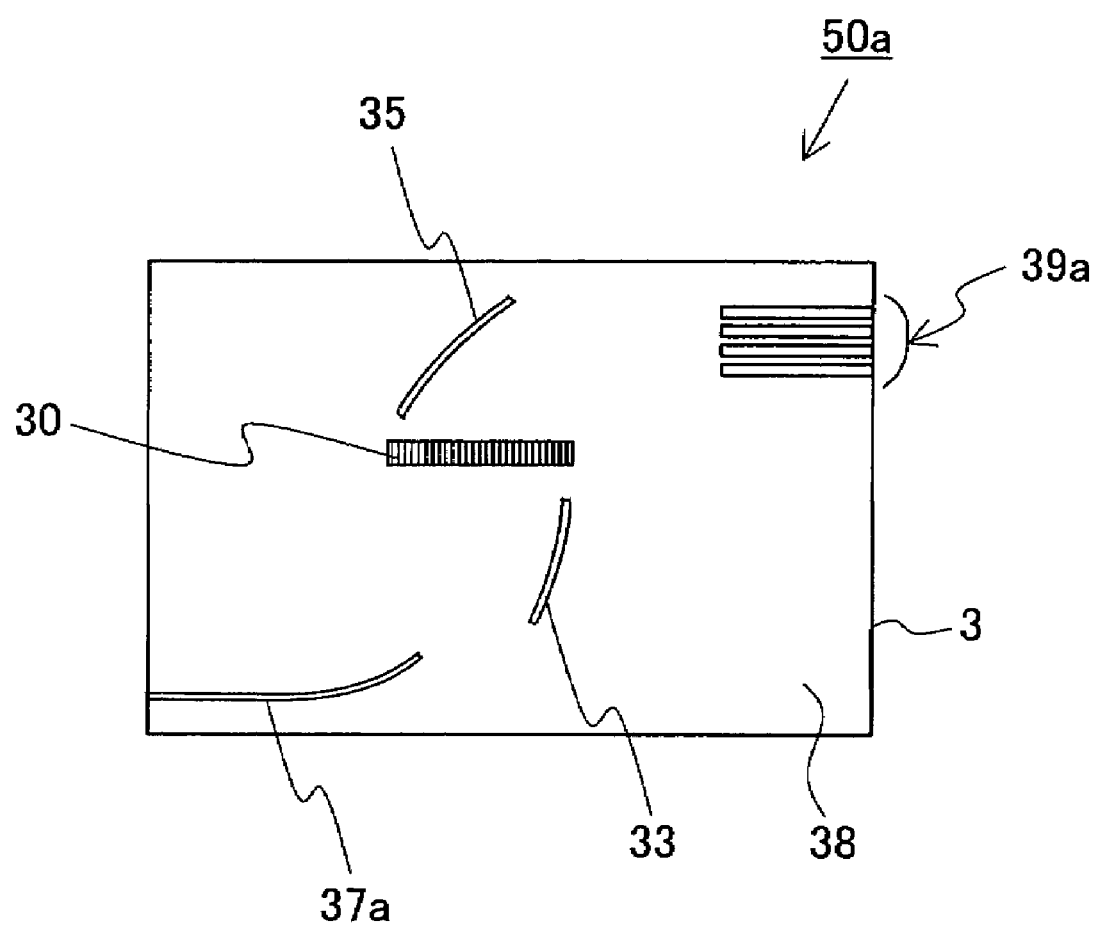
FIG. 9 is a schematic plan view showing a configuration of an optical circuit according to Embodiment 4 of the present invention.

An optical circuit according to Embodiment 4 of the present invention will be described with reference to FIG. 9. FIG. 9 is a schematic plan view showing a configuration of an optical circuit 50a according to Embodiment 4. The optical circuit 50a of Embodiment 4 has substantially the same configuration as that of the optical circuit 50 of Embodiment 3 shown in FIGS. 7A and 7B. The optical circuit 50a is different from the optical circuit 50 in that a light input portion 37a and a light output portion 39a that are channel optical waveguides are used in Embodiment 4, instead of the light input portion 37 and the light output portion 39 that are optical fibers in Embodiment 3, and the light input portion 37a and the light output portion 39a are formed in the core layer 31 (see FIG. 7B). A channel waveguide refers to a waveguide having a core finite boundary in a cross-sectional direction) molded so as to be a rectangle or a circle on a substrate. The same components as those in Embodiment 3 are denoted with the same reference numerals as those therein, and the description thereof will be omitted here.

The light input portion 37a, the light output portion 39a, the diffraction grating 30, the input portion 33 that is a concave mirror, and the focusing portion 35 that is a concave mirror are placed in the core layer (not shown) sandwiched between the cladding layer (not shown) and the substrate 38. Optical fibers or the like for coupling light to the light input portion 37a and the light output portion 39a will be used, although they are not shown. Because of such a configuration, the arrangement of the diffraction grating 30, the input portion 33, the focusing portion 35, and the light input portion 37a, and the light output portion 39a are previously determined. Therefore, the regulation of an incident angle and a focal length, and positional adjustment are not required. For example, an optical fiber only needs to be connected to the light input portion 37a. Furthermore, by using a channel waveguide that is the light output portion 39a, focal points formed by the focusing portion 35 can be positioned at an interval of about 10 μm, so that the optical circuit can be miniaturized further.

EXAMPLE 6

An optical demultiplexer of Example 6 that is a specific example of the optical circuit 50a of Embodiment 4 will be described with reference to FIGS. 10 and 11.

Figure 10:
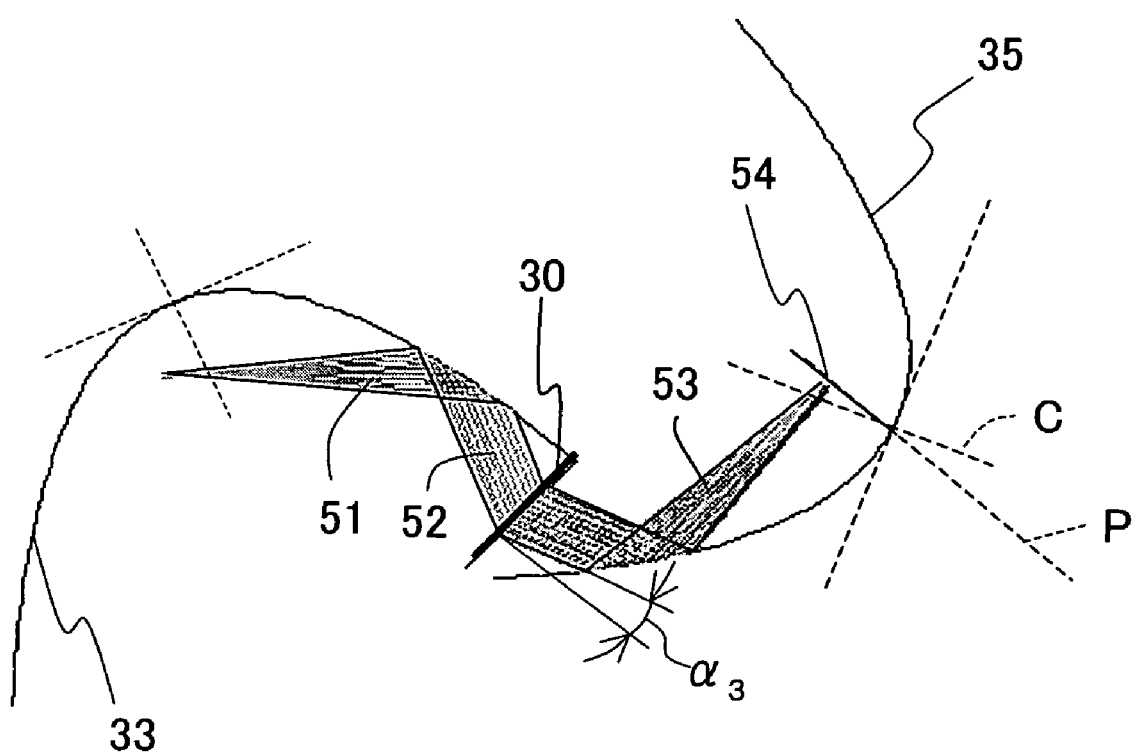
FIG. 10 schematically shows an optical path of propagated light in an optical circuit of Example 6.
Figure 11:
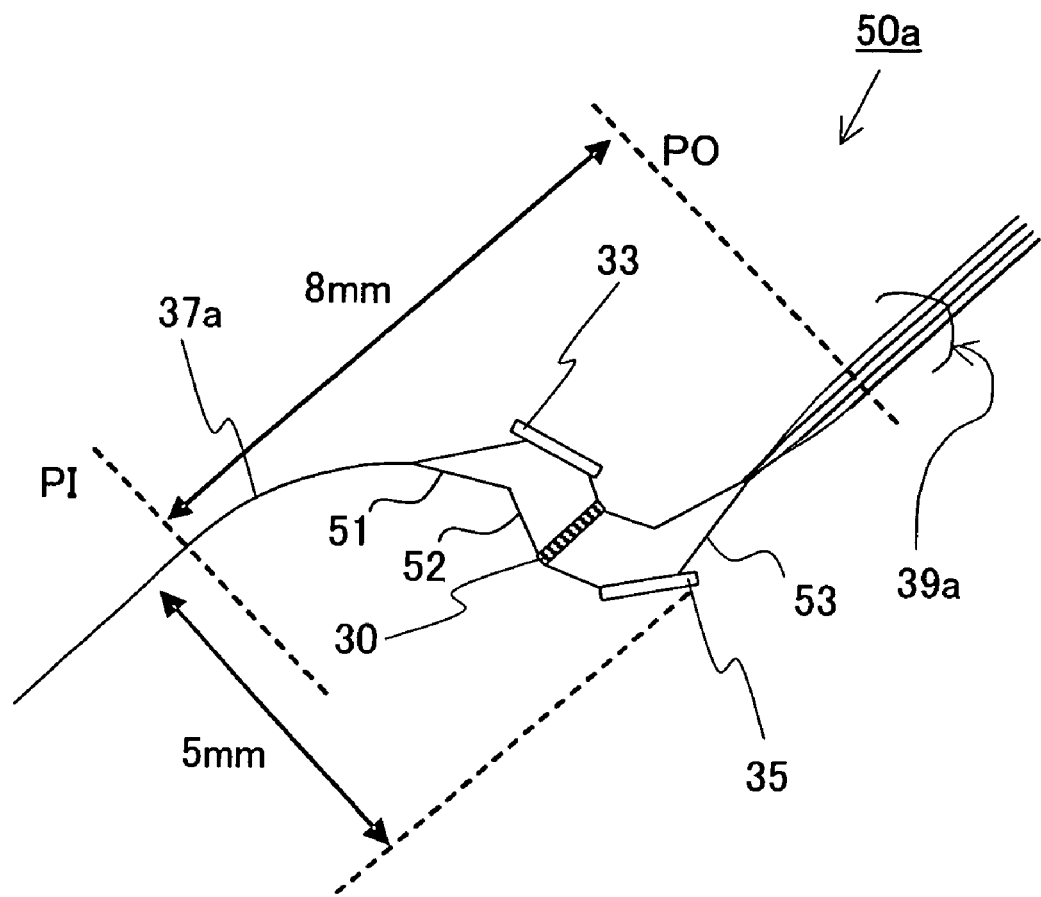
FIG. 11 shows an example of a specific shape of an optical circuit that is a flat optical circuit type optical demultiplexer.
Figure 12A:
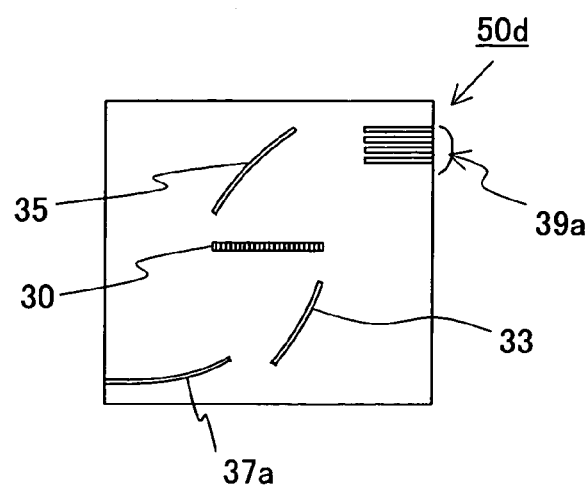
FIG. 12A is a schematic plan view showing an exemplary configuration of the optical circuit.
Figure 12B:
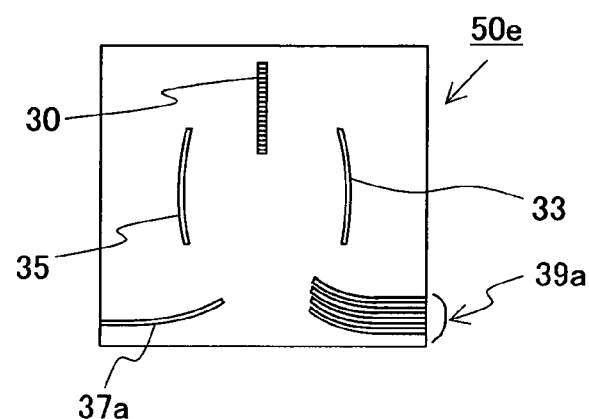
FIG. 12B is a schematic plan view showing an exemplary configuration of the optical circuit.
Figure 12C:
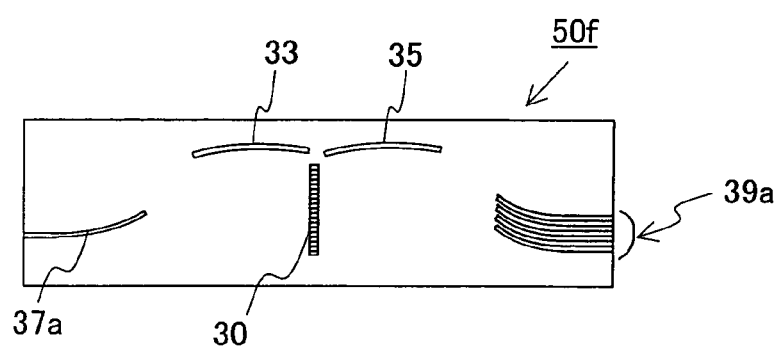
FIG. 12C is a schematic plan view showing an exemplary configuration of the optical circuit.
Figure 12D:
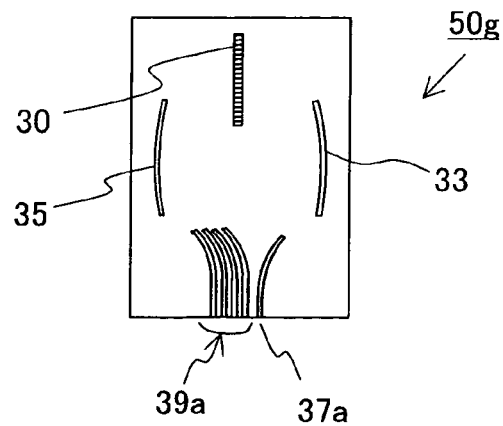
FIG. 12D is a schematic plan view showing an exemplary configuration of the optical circuit.

FIGS. 10 and 11 show an exemplary configuration of a specific optical system of the optical circuit 50a of Example 6. FIG. 10 schematically shows an optical path of propagation light. Light 51 incident from a channel optical waveguide of a light input portion (not shown) is converted to collimated light 52 at an incident portion 33 that is a concave mirror, and is incident upon a diffraction grating 30. Demultiplexed light 53 having passed through the diffraction grating 30 is focused onto an end face 54 of a channel optical waveguide array of a light output portion (not shown) at a focusing portion 35 that is a concave mirror.

It is assumed that the incident portion 33 and the focusing portion 35 that are concave mirrors are parabolic mirrors. Each parameter is as follows:

Wavelength of incident light: 1.51, 1.53, 1.55, 1.57 μm

NA of an optical waveguide: 0.17

Period a of the diffraction grating 30: 1.45 μm
Depth D of the diffraction grating 30: 1 mm
Focal length f of the concave mirror: 1.68 mm
Radius of curvature of the concave mirror: 1 mm
Distance S between focal points of the light output portion: 17.4 μm Because of the above-mentioned configuration, light with a channel spacing of 20 nm can be demultiplexed. Furthermore, by tilting a focal plane P of the light output portion shown in FIG. 10 by an output angle $\alpha_3$ (angle between a grating vertical line and output light) from the diffraction grating 30 with respect to an axis C of a paraboloid of the focusing portion 35 that is a concave mirror, a more optimum spot diameter can be obtained.

FIG. 11 shows an example of a specific shape of the optical circuit 50a that is a PLC type demultiplexer produced in accordance with the above-mentioned optical design. A part of a channel optical waveguide of a light input portion 37a for setting an incident end face PI and an output end face PO of light to be a parallel plane is formed as a bent waveguide. The size of the optical circuit 50a is about 5 mm×8 mm. Thus, it is understood that a very compact optical demultiplexer can be obtained.

Needless to say, by inverting the input/output directions of light, the optical circuit 50a also can be used as a multiplexer. That is, it also is possible to allow light beams having different wavelengths to be incident upon an optical waveguide array of a light output portion 39a, multiplex the light beams, and allow them to be output from a waveguide that is the input portion 37a. Herein, although multiplexing/demultiplexing of four wavelengths have been described, it is possible to increase the number of channels, and narrow a wavelength width.

Furthermore, there is no particular limit to the circuit arrangement of an optical circuit as long as the above-mentioned conditions are satisfied. Various arrangements as shown in FIGS. 12A, 12B, 12C, and 12D are considered. In an optical circuit 50d in FIG. 12A, the incident portion 33 and the focusing portion 35, and the input portion 37a and the output portion 39a are positioned so as to be symmetric with respect to a point. Furthermore, in an optical circuit 50e in FIG. 12B, the incident portion 33 and the focusing portion 35, and the input portion 37a and the output portion 39a are positioned so as to be symmetric with respect to a line. In an optical circuit 50f in FIG. 12C, the incident portion 33 and the focusing portion 35, and the input portion 37a and the output portion 39a are positioned so as to be symmetric with respect to a line. Furthermore, in an optical circuit 50g in FIG. 12D, the incident portion 33 and the focusing portion 35, and the input portion 37a and the output portion 39a are positioned so as to be symmetric with respect to a line, and the input portion 37a and the output portion 39a are placed on the same end face. Other arrangements may be used as well.

Figure 13A:
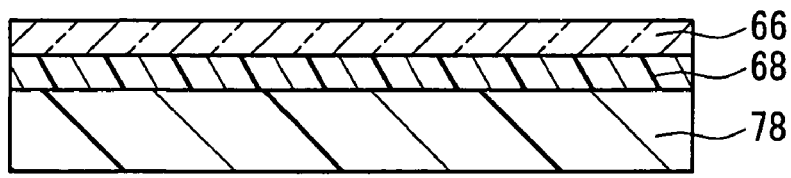
FIG. 13A is a cross-sectional view showing production processes of the optical element according to Embodiment 2 of the present invention.

Hereinafter, a method for producing the optical element 2 of Embodiment 2 shown in FIGS. 6A and 6B will be described. For producing the optical element 2, patterning by photolithography and groove processing by dry etching are used. The production procedure will be described with reference to FIGS. 13A, 13B, 13C, and 13D. A lower cladding layer 68 is formed on a substrate 78, if required. A core layer 66 is formed on the lower cladding layer 68 (FIG. 13A). As a deposition process, it is known that CVD, PVD, FHD, or the like can form a film of good quality with a low loss; however, there is no particular limit.

Figure 13B:
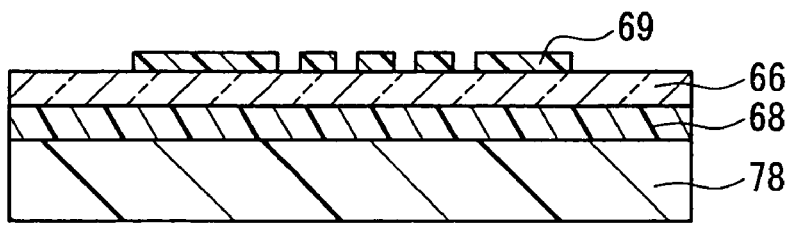
FIG. 13B is a cross-sectional view showing production processes of the optical element according to Embodiment 2 of the present invention.

Next, a metal mask 69 for producing constituent elements of an optical demultiplexer of an optical circuit type is formed by a so-called lift-off method. First, the surface of the core layer 66 is spin-coated with a material (hereinafter, referred to as a resist) that is sensitized by irradiation with energy such as a UV-ray, an electron beam, an X-ray, or the like. Thereafter, a resist pattern of desired constituent elements is produced by an appropriate light-exposure procedure. Then, a metal film is formed on the resist pattern. As a film formation procedure, sputtering, vapor deposition, or the like can be used. As a metal film, chromium, tungsten silicide, nickel, or the like can be used. Particularly, in the case of using a lift-off method, in terms of damage to a photoresist, enhancement of a patterning precision, etc., it is desirable to use vapor deposition or directional sputtering. By removing an unnecessary metal film together with the resist pattern, the metal mask 69 is patterned (FIG. 13B).

The following also is possible. The order of resist formation and metal film formation is exchanged to form a pattern of the metal mask 69 by etching. In this case, it is desirable to select a metal material to be etched easily.

Figure 13C:
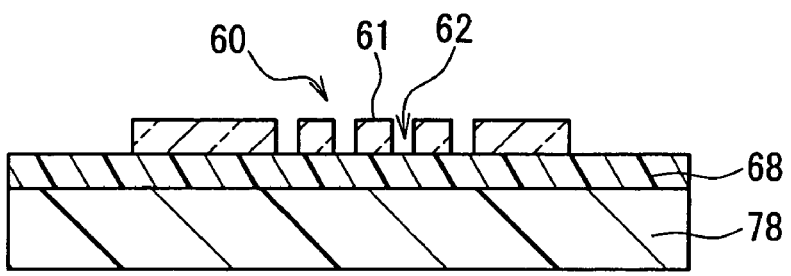
FIG. 13C is a cross-sectional view showing production processes of the optical element according to Embodiment 2 of the present invention.

Next, the core layer 66 is subjected to groove processing by using an ion etching apparatus, whereby a structure (diffraction grating) 60 in which ridges 61 and grooves 62 are arranged periodically is formed. Along with this, constituent elements of the optical demultiplexer, such as other optical elements, an optical waveguide, and the like, are produced. An etching apparatus should be selected so as to be suitable for a material to be processed. However, in order to process a large area efficiently, it is desirable to use a reactive ion etching method using high-density plasma, such as inductively coupled plasma (ICP) and magnetic neutral loop discharge plasma (NLD). The remaining metal mask 69 may be removed by using an etchant, dry etching, or the like (FIG. 13C).

Figure 13D:
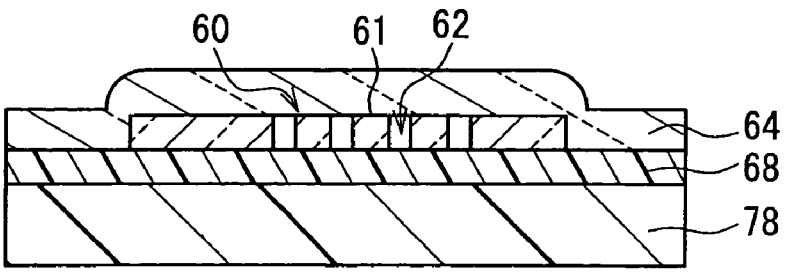
FIG. 13D is a cross-sectional view showing production processes of the optical element according to Embodiment 2 of the present invention.

Finally, an upper cladding layer 64 is formed by the CVD (FIG. 13D). As described above, conditions are set so as not to allow the upper cladding layer 64 to be incorporated into the grooves 62 of the structure 60.

As described above, the optical element of Embodiment 2 can be produced easily by conventional lithography. By forming an incident portion, a focusing portion, a light input portion, and a light output portion in the core layer of the optical element, the optical circuit of Embodiments 3 and 4 can be produced.

The optical circuits of Embodiments 3 and 4 are optical demultiplexers. However, by allowing light to be incident upon a light output side and to be output from a light input side, the optical demultiplexers also can be used as optical multiplexers for sending light beams having a plurality of wavelengths to a single optical fiber.

Furthermore, a plurality of optical elements may be placed in an optical circuit. Because of this, wavelength dispersion is increased in proportion to the number of wavelengths. In the case where a channel spacing is very narrow as in the DWDM, by placing a plurality of optical elements in an optical circuit, a wavelength resolution can be enhanced, and an element size can be kept small. Furthermore, optical elements are molded integrally by lithography, so that the number of processes is not increased, and hence, a cost is not increased.

On the other hand, in the optical recording field, a recording device such as a DVD, aiming at an increase in capacity, is being developed recently. It is apparent that there is a demand for an increase in a recording/reading speed along with an increased capacity of recording information. An exemplary method for increasing a recording/reading speed includes simultaneous recording/reading with a multi-wavelength. According to this method, light obtained by multiplexing a plurality of wavelengths is guided to an optical head, and the light is demultiplexed in the optical head, whereby writing/reading with light having a plurality of wavelengths is performed, which enables parallel processing of information. In this case, an optical head is required to be small, considering that the optical head scans a disk, and the optical circuit of the present embodiment is suitable for being incorporated in such a system.

In Embodiments 1 and 2, the optical elements that have a structure with a one-dimensional periodicity having rectangular periodic grooves have been described. Other shapes also are applicable to the structure. This will be described below specifically.

The periodic structure is classified into a one-dimensional periodic structure, a two-dimensional periodic structure, and a three-dimensional periodic structure, depending upon the axial direction having periodicity.

Figure 14A:
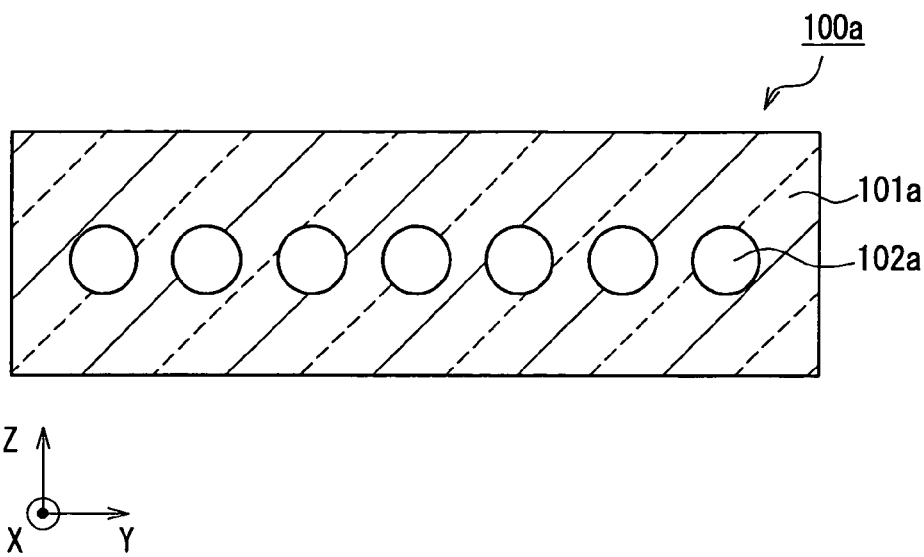
FIG. 14A is a plan view of a one-dimensional periodic structure.
Figure 14B:
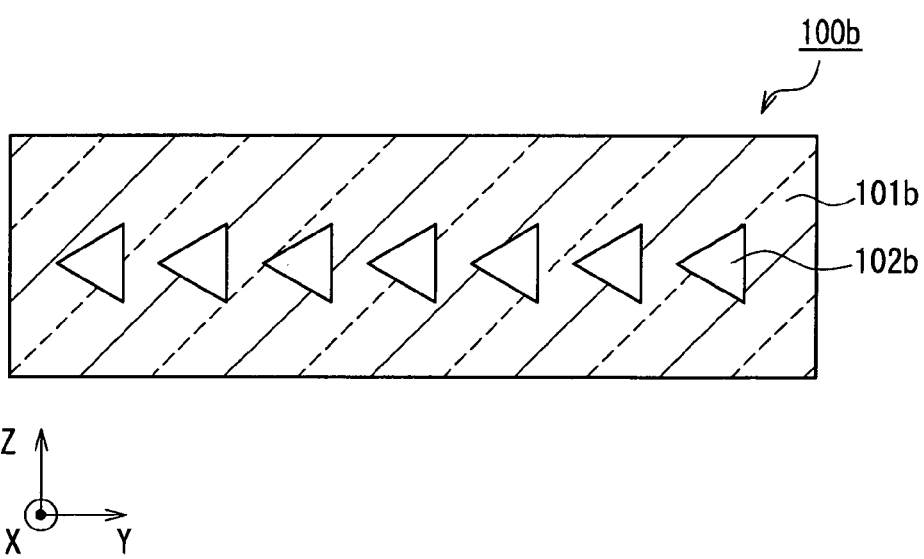
FIG. 14B is a plan view of a one-dimensional periodic structure.
Figure 14C:
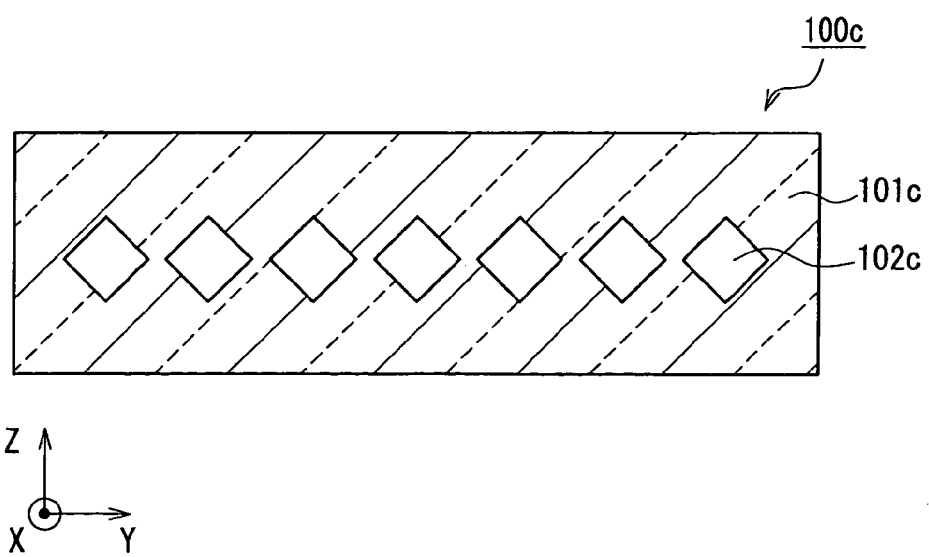
FIG. 14C is a plan view of a one-dimensional periodic structure.

First, FIGS. 14A, 14B, and 14C show plan views of exemplary one-dimensional periodic structures. A periodic structure 100a shown in FIG. 14A has a configuration in which cylindrical grooves 102a are arranged periodically in a solid 101a. FIG. 14B shows a periodic structure 100b in which grooves 102b in the shape of a triangular prism are arranged periodically in a solid 101b. FIG. 14C shows a periodic structure 100c in which grooves 102c in the shape of a quadratic prism are arranged periodically in a solid 101c. By covering surfaces of the periodic structures 100a, 100b, and 100c on which the grooves 102a, 102b, and 102c are formed with covering layers, optical elements can be produced. A Y-axis in the drawings has periodicity. The shape of the grooves may be a polygonal prism such as a pentagonal prism or more, an elliptic cylinder, or other irregular shape. It is desirable to produce a periodic structure so as not to bring respective grooves or respective ridges into contact with each other to impair a periodic structure.

An optical element may be produced by using the periodic structure 100a, 100b, or 100c shown in FIG. 14A, 14B, or 14C.

Figure 15:
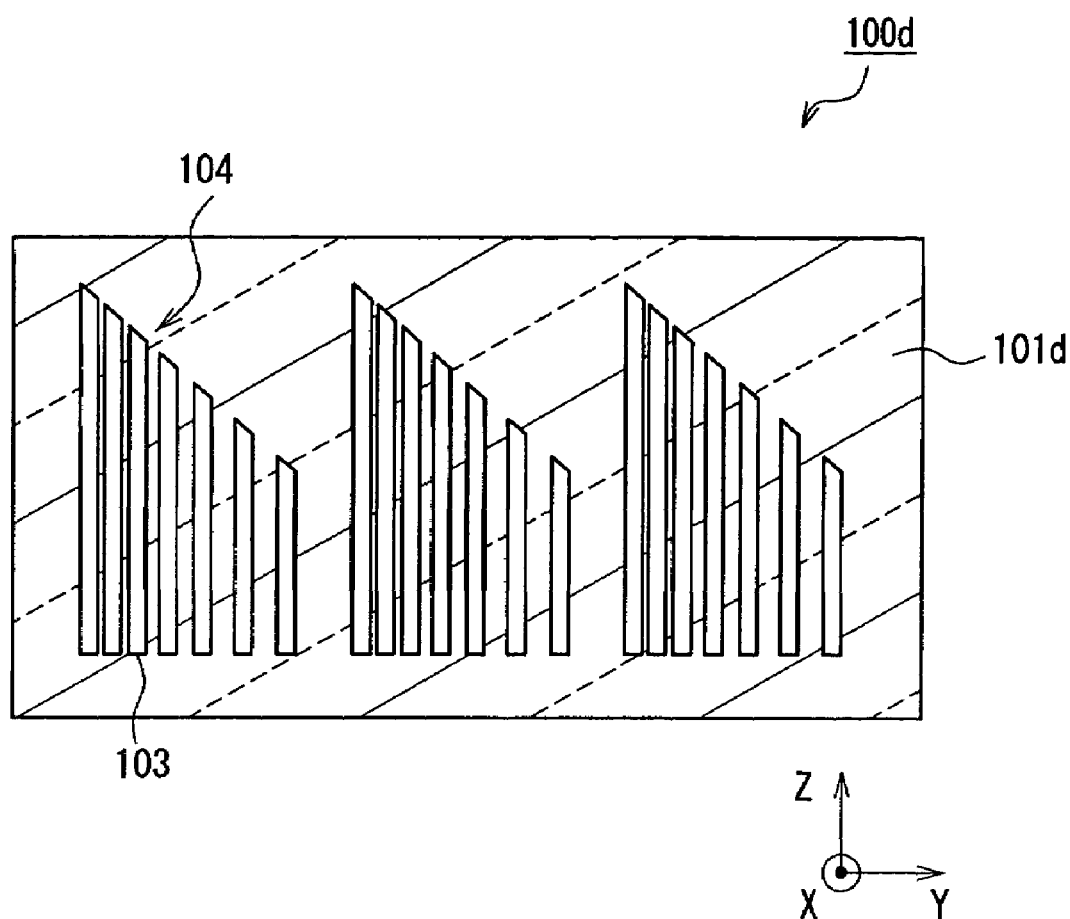
FIG. 15 is a plan view of a periodic structure.

FIG. 15 is a plan view of another periodic structure 100d. An optical element may be produced by using the periodic structure 100d. The periodic structure 100d is an example in which patterns 104 are arranged periodically in a solid 101d. The pattern 104 is composed of a plurality of spaces with respective grooves 103 being varied in an interval and a width in a Y-axis direction, and a plurality of the patterns 104 are arranged periodically. For example, the length of the grooves 103 may be varied in a Z-axis direction. Although the periodic structure 100d shown in FIG. 15 is a two-dimensional periodic structure, the direction of a periodic arrangement is one-dimensional.

Furthermore, in FIGS. 14A-14C, and 15, the case where grooves that are concave portions are arranged periodically have been described. Convex portions that are ridges may be arranged periodically, and both concave portions and convex portions may be arranged periodically.

Furthermore, the cross-section in a direction (X-axis direction) vertical to a substrate surface of the grooves or the ridges may not be a rectangle. For example, the cross-section may have a barrel shape. The cross-section also may have a cone shape, a pyramid shape, a tapered shape, or a reverse tapered shape. The grooves tilted from the direction vertical to the substrate surface may be formed in parallel with each other. Thus, the grooves or ridges are not necessarily provided vertically to the substrate surface, and the grooves or the ridges may be provided irregularly or asymmetrically.

Next, a specific example of a two-dimensional periodic structure will be described. The two-dimensional periodic structure basically may have a configuration in which the above-mentioned one-dimensional periodic structures are arranged two-dimensionally.

FIGS. 16A, 16B, 16C, and 16D show plan views of exemplary two-dimensional periodic structures. In a periodic structure 110a shown in FIG. 16A, grooves 111a in the shape of a quadratic prism are arranged in a lattice form in a solid 112a. In a periodic structure 110b shown in FIG. 16B, grooves 111b in the shape of a triangular prism are arranged in a triangular lattice form in a solid 112b.

Figure 16A:
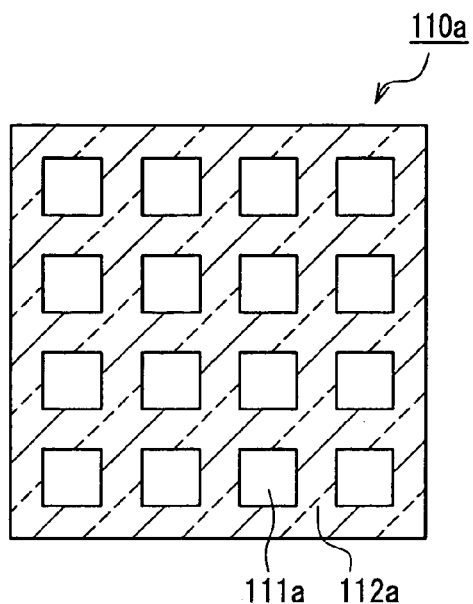
FIG. 16A is a plan view of a two-dimensional periodic structure.
Figure 16B:
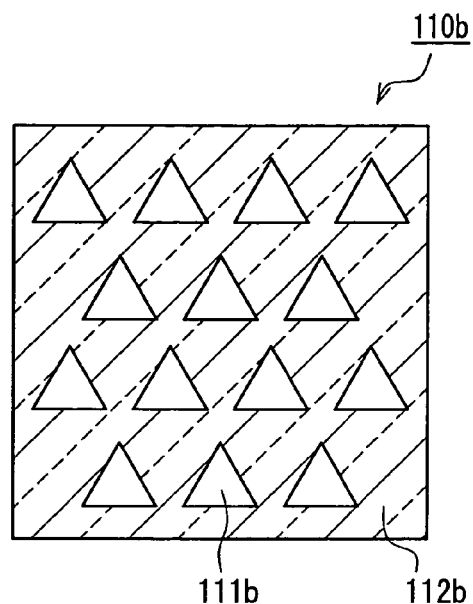
FIG. 16B is a plan view of a two-dimensional periodic structure.
Figure 16C:
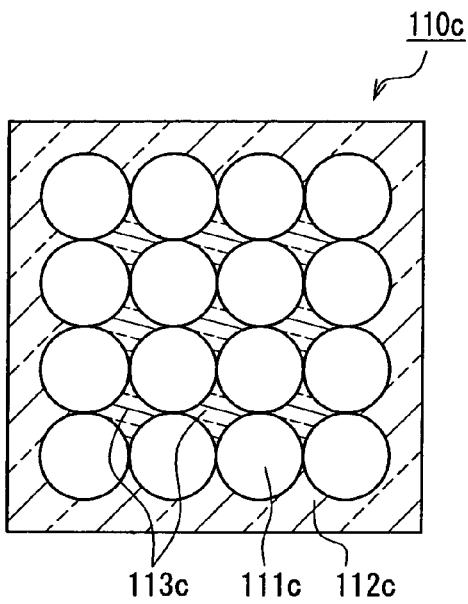
FIG. 16C is a plan view of a two-dimensional periodic structure.

In a periodic structure 110c shown in FIG. 16C, cylindrical grooves 111c are arranged in a square lattice form in a solid 112c so as to be in contact with each other. Since the grooves 111c are in contact with each other, ridges (convex portions) 113c isolated from the solid 112c are formed, and the ridges 113c also are arranged in a square lattice form.

Figure 16D:
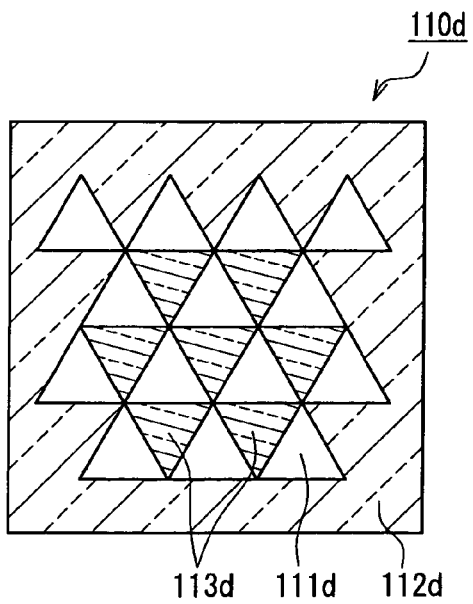
FIG. 16D is a plan view of a two-dimensional periodic structure.

In a periodic structure 110d shown in FIG. 16D, grooves 111d in the shape of a triangular prism are arranged in a triangular lattice form in a solid 112d so that respective vertexes are in contact with each other. Since the grooves 111d are in contact with each other, ridges (convex portions) 113d isolated from the solid 112d are formed, and the ridges 113d also are arranged in a triangular lattice form. Optical elements may be produced by using these periodic structures.

Thus, a two-dimensional arrangement includes an arrangement shape such as a square lattice, a triangular lattice, a polygonal lattice, and a concentric circle, and an arrangement period may be varied. For example, if a defective portion (a region where holes are not formed) is introduced into one line in a photonic crystal in which circular holes are arranged in a square form, a buried-type photonic crystal defect waveguide can be realized. Furthermore, in the case where circular line grooves are arranged concentrically with a period being varied appropriately, a buried-type binary blazed grating lens can be formed.

Furthermore, if a multi-layered film is processed into rectangular grooves in a one-dimensional arrangement, a two-dimensional periodic structure can be obtained. For example, if rectangular grooves (line & space grooves) are formed in a multi-layered film having a large refractive index difference made of silica/silicon, a polarizer can be obtained.

In FIGS. 16A, 16B, 16C, and 16D, the case where grooves (concave portions) are arranged periodically has been described. However, convex portions made of ridges may be arranged periodically.

Figure 17:
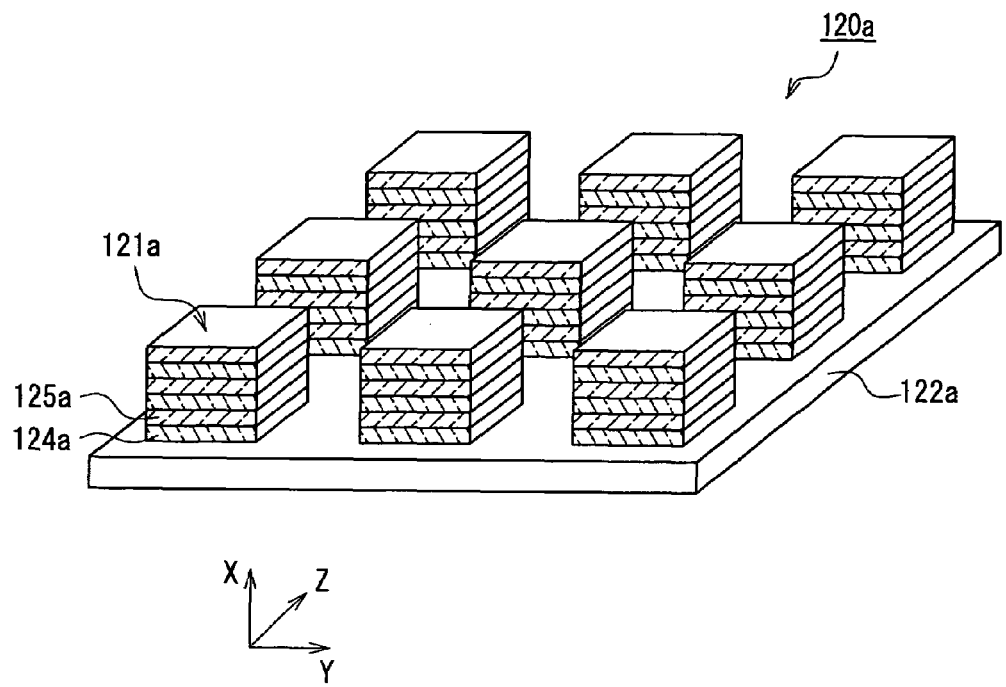
FIG. 17 is a perspective view showing a configuration of a three-dimensional periodic structure.

Furthermore, if the solids 110a to 110d are formed as multi-layered films, and processed in a two-dimensional arrangement, three-dimensional periodic structures can be obtained. FIG. 17 is a perspective view showing a configuration of a three-dimensional periodic structure in which convex portions in the form of a quadratic prism made of a multi-layered film are arranged in a square form. A three-dimensional periodic structure 120a has a configuration in which multi-layered films 121a each including first layers 124a and second layers 125a stacked on top of the other are arranged in a square form.

Figure 18:
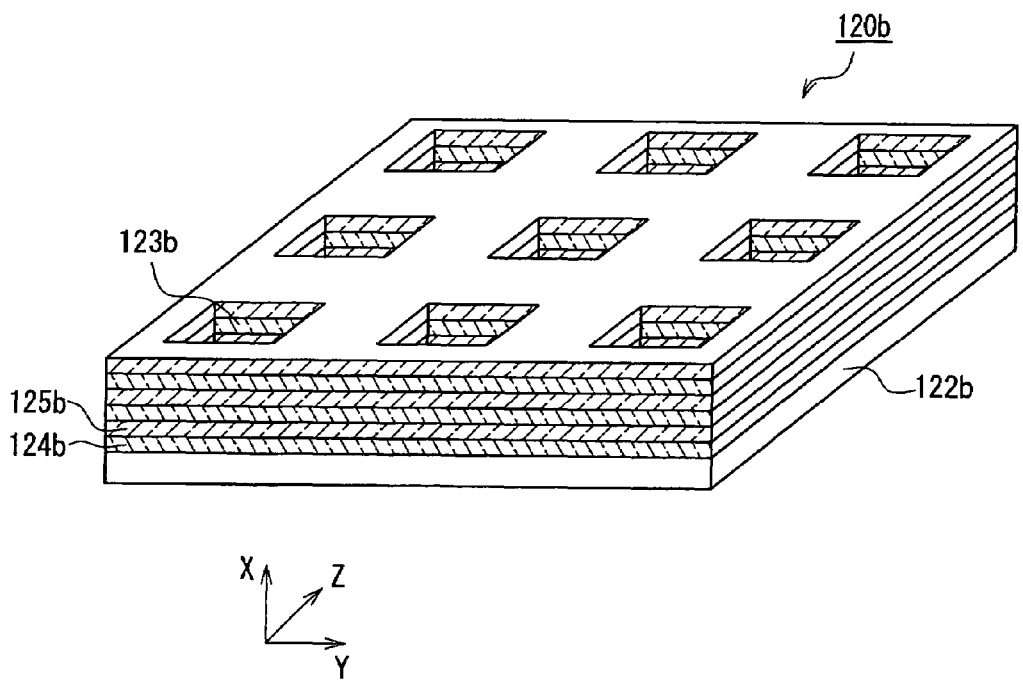
FIG. 18 is a perspective view showing a configuration of a three-dimensional periodic structure.

FIG. 18 is a perspective view showing a configuration of a periodic structure 120b in which grooves 123b arranged periodically in a multi-layered film are formed. The grooves 123b are arranged in a square form in a multi-layered film in which the first layers 124b and the second layers 125b are stacked.

Figure 19:
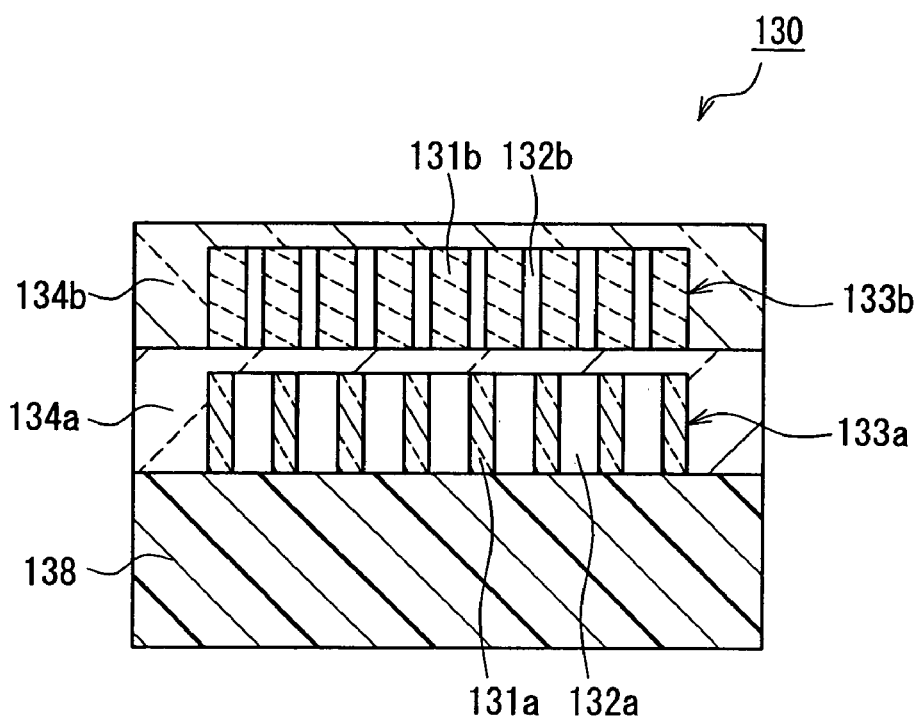
FIG. 19 is a cross-sectional view showing a configuration of an optical element having a layered structure.

Furthermore, since the surface of the optical element of the present embodiment is flat, the optical element itself may be stacked. For example, FIG. 19 is a cross-sectional view showing a configuration of an optical element 130 having stacked buried-type periodic structures. In the optical element 130, a structure 133a in which ridges 131a and grooves 132a are arranged periodically is placed on a substrate 138. The structure 133a is covered with a covering layer 134a. On the covering layer 134a, a structure 133b in which ridges 131b and grooves 132b are arranged periodically is placed. The structure 133b is covered with a covering layer 134b. In FIG. 19, although the periodicity of the periodic structure 133a is different from that of the structure 133b, they may be the same.

Thus, in the optical element 130, the upper surface of the covering layer 134a is flat, so that not only a simple flat layer but also a multi-layered film or another periodic structure can be formed. For example, the flat covering layer 134a can be used as a platform for mounting a surface emitting laser, a photodetector, etc. Furthermore, in the case where the above-mentioned periodic structure is formed, the covering layer 134b can be formed. Therefore, in principle, periodic structures can be stacked without limit.

In addition to a periodic structure, a concave/convex shape of a spherical surface of lens or the like, a lens array, a triangular prism shape, a prism array, a mirror, and the like may be stacked on the optical element. In particular, it is preferable that a structure that cannot be buried is formed on an uppermost surface. In the case of forming a structure on a covering layer, the structure is not required to be formed on an underlying structure, and may be formed at an arbitrary position.

Figure 20:
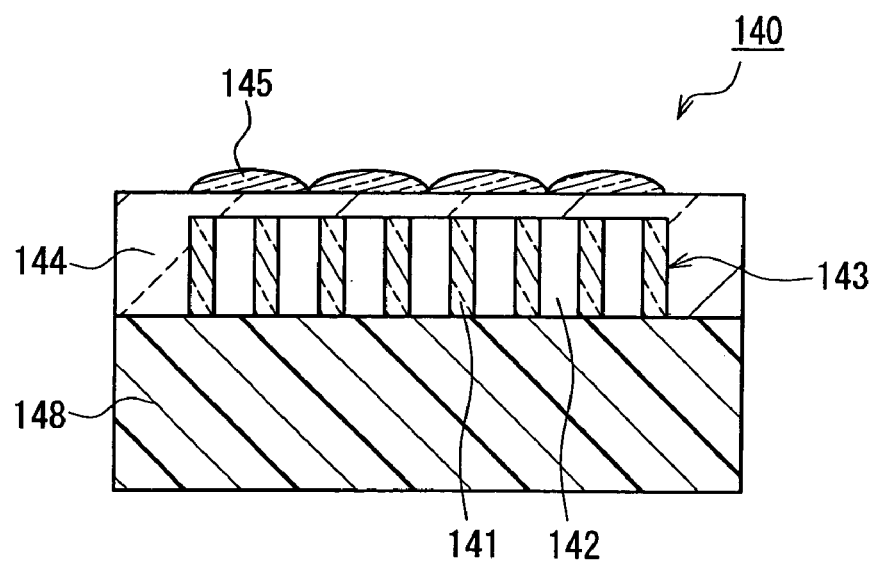
FIG. 20 is a cross-sectional view showing a configuration of an optical element provided with a lens.

FIG. 20 is a cross-sectional view showing a configuration of an optical element 140 provided with a lens 145. As shown in FIG. 20, in the optical element 140, a structure 143, in which ridges 141 and grooves 142 are arranged periodically, is placed on a substrate 148, and the structure 143 is covered with a covering layer 144. Furthermore, the lens 145 is arranged in an array form on the covering layer 144. The optical element 140 can focus light incident upon the structure 143 or light output from the structure 143 at the lens 145, or convert the light into collimated light.

Figure 21:
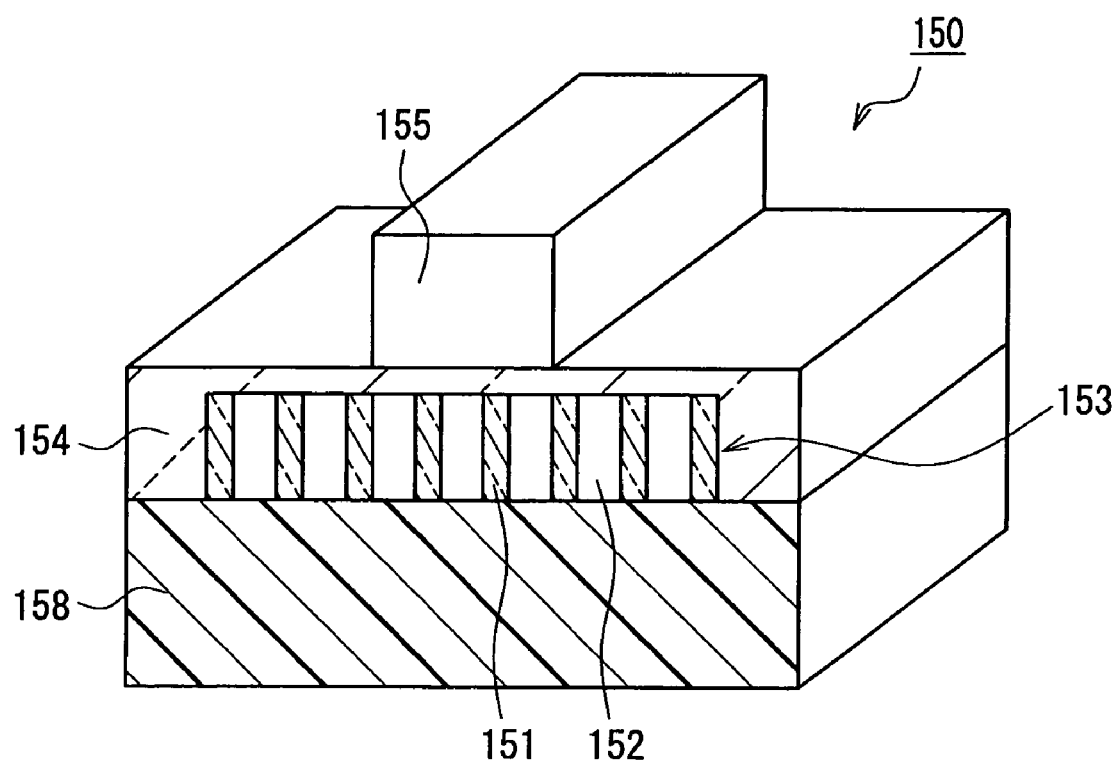
FIG. 21 is a cross-sectional perspective view showing a configuration of an optical element provided with an optical waveguide.

FIG. 21 is a cross-sectional perspective view showing an exemplary configuration of an optical element 150 provided with an optical waveguide 155 as an optical component. In the optical element 150, a structure 153, in which ridges 151 and grooves 152 are arranged periodically, is placed on a substrate 158, and the structure 153 is covered with a covering layer 154. Furthermore, an optical waveguide 155 is placed on the covering layer 154. The optical element 150 allows light output from the structure 153 to be incident upon the optical waveguide 155 and propagate therethrough.

Thus, a lens array and an optical waveguide can be provided on the optical element according to the present embodiment of the present invention, so that a further integrated optical element can be provided.

Furthermore, according to the present embodiment of the present invention, not only an optical demultiplexer, but also an optical circuit having another function, such as a photonic crystal and a polarizer, can be produced. Light is allowed to propagate not only in a substrate surface direction (in an optical waveguide), but also in a direction vertical to the substrate surface. In the optical waveguide, an integrated circuit having optical functions such as multiplexing/demultiplexing, separation of polarized light, delay, etc. can be molded integrally. On the other hand, in a direction vertical to a substrate surface, a lens array can be formed, since the surface of an uppermost covering layer is flat. Thus, an optical element and an optical circuit can be produced in a direction vertical to a substrate surface.

Furthermore, the optical element according to the present embodiment of the present invention is multi-functional, and can be used particularly for an optical demultiplexer that demultiplexes light having a plurality of wavelengths by using a diffraction grating. Furthermore, the optical element can be miniaturized, and can separate wavelength at a high efficiency with less dependency on polarization. Therefore, the optical element can be used for an apparatus for separating light having different wavelengths, such as an optical communication system or a pickup apparatus for an optical disk.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical element comprising a structure having at least one convex portion and at least one concave portion formed so as to be adjacent to either one of the convex portions in a core layer, the core layer being interposed between an upper cladding layer which covers one surface of the structure and a lower cladding layer and the core layer having a refractive index higher than those of the upper cladding layer and the lower cladding layer, and the optical element having a hollow portion,
    wherein an aspect ratio of the concave portion is set to be 2 or more, the aspect ratio being a depth/width ratio of the concave portion,
    wherein the upper cladding layer is formed by a deposition process such that the height of the hollow portion is the same as the depth of the concave portion,
    wherein the structure is placed on a substrate or on a solid layer stacked above the substrate, and
    wherein the structure is a diffraction grating for first-order diffracting incident light.

2. The optical element according to claim 1, wherein the convex portion has a multi-layered structure.

3. The optical element according to claim 2, wherein the number of the convex portions is one, and a plurality of the concave portions are formed.

4. An optical element comprising a plurality of the optical elements of claim 1, wherein the plurality of optical elements are stacked.

5. The optical element according to claim 1, wherein the diffraction grating of the structure is a periodic structure in which the convex portion and the concave portion are arranged periodically in an alternate manner, a depth of the concave portion is larger than ½ times a width of the concave portion, and an arrangement period of the periodic structure is in a range of 1/20 times to 20 times a wavelength of light to be used.

6. The optical element according to claim 5, wherein the depth of the concave portion is twice or more the width of the concave portion.

7. An optical circuit comprising: the optical element according to claim 1, further comprising an incident portion; and a focusing portion,
    wherein the incident portion controls a spread angle of light incident upon the optical element, the focusing portion focuses light demultiplexed to light having a plurality of different wavelength components by the optical element, and the incident portion and the focusing portion are placed in the core layer.

8. The optical circuit according to claim 7, wherein at least one of the incident portion and the focusing portion is a concave mirror.

9. The optical circuit according to claim 8, wherein the concave mirror is formed of an interface between the core layer and a space formed in the core layer.

10. The optical circuit according to claim 7, wherein the incident portion and the focusing portion are concave mirrors, the concave mirrors are formed of an interface between the core layer and a space formed in the core layer, and a shape of the interface between the core layer and the space forming the concave mirror is a part of a parabola surface.

11. The optical circuit according to claim 7, wherein the incident portion and the focusing portion are concave mirrors, and assuming that an incident angle of light to a concave mirror that is the incident portion is $\alpha_1$, an incident angle of light to a concave mirror that is the focusing portion $\alpha_2$, an incident angle of light incident upon the structure that is the diffraction grating is $\beta_1$, and output angle of light output from the structure that is the diffraction grating is $\beta_2$, a grating period of the structure that is the diffraction grating is $\alpha$, a minimum channel spacing is $\Delta\lambda$, a central wavelength is $\lambda_0$, and a diffraction order is m, the following conditions are satisfied:

a width of the structure that is the diffraction grating capable of diffracting light is equal to $2a\cdot(\lambda_0/\Delta\lambda)m$ or more, a width of the concave mirror that is the incident portion capable of reflecting light is equal to $2a\cdot\cos\beta_1\cdot(\lambda_0/\Delta\lambda)/(m\cdot\cos\alpha_1)$ or more, and a width of the concave mirror that is the focusing portion capable of reflecting light is equal to $2a\cdot\cos\beta_2\cdot(\lambda_0/\Delta\lambda)/(m\cdot\cos\alpha_2)$ or more.

12. The optical circuit according to claim 7, wherein the incident portion and the focusing portion are concave mirrors, and the optical circuit comprises, a light input portion for allowing light to be incident upon the incident portion that is the concave mirror, and a plurality of light output portions for combining a plurality of light beams output from the focusing portion that is the concave mirror.

13. The optical circuit according to claim 12, wherein the light input portion and the light output portion are placed in the core layer.

14. A method for producing an optical element, comprising covering at least one surface of a structure having at least one convex portion and at least one concave portion formed so as to be adjacent to either one of the convex portions in a core layer, the core layer being interposed between an upper cladding layer which covers one surface of the structure and a lower cladding layer and the core layer having a refractive index higher than those of the upper cladding layer and the lower cladding layer, thereby producing at least one hollow portion, wherein an aspect ratio of the concave portion is set to be 2 or more, the aspect ratio being a depth/width ratio of the concave portion, wherein, after the structure is provided on a substrate or on a solid layer stacked on the substrate, the at least one surface of the structure is covered with the upper cladding layer formed by a deposition process such that the height of the hollow portion is the same as the depth of the concave portion, and wherein the structure is a diffraction grating for first-order diffracting incident light.

15. The method for producing an optical element according to claim 14, wherein the deposition process is at least one selected from the group consisting of chemical vapor deposition, physical vapor deposition, and flame hydrolysis deposition.

16. The method for producing an optical element according to claim 14, wherein the convex portion and the concave portion of the structure are formed by photolithography or etching.

17. The method for producing an optical element according to claim 14, wherein the hollow portion is produced substantially only by the formation of the concave portion and the deposition of the covering layer.

* * * * *